(12) United States Patent
Murase et al.

(10) Patent No.: US 9,768,652 B2
(45) Date of Patent: Sep. 19, 2017

(54) SUPERCONDUCTING FIELD POLE

(71) Applicants: KAWASAKI JUKOGYO KABUSHIKI KAISHA, Hyogo (JP); NATIONAL UNIVERSITY CORPORATION TOKYO UNIVERSITY OF MARINE SCIENCE AND TECHNOLOGY, Tokyo (JP)

(72) Inventors: Yohei Murase, Kobe (JP); Katsuya Umemoto, Akashi (JP); Mitsuru Izumi, Tokyo (JP); Keita Tsuzuki, Ise (JP)

(73) Assignees: KAWASAKI JUKOGYO KABUSHIKI KAISHA, Kobe (JP); NATIONAL UNIVERSITY CORPORATION TOKYO UNIVERSITY OF MARINE SCIENCE AND TECHNOLOGY, Tokyo (JP)

( * ) Notice: Subject to any disclaimer, the term of this patent is extended or adjusted under 35 U.S.C. 154(b) by 195 days.

(21) Appl. No.: 14/427,467

(22) PCT Filed: Sep. 5, 2013

(86) PCT No.: PCT/JP2013/005257
§ 371 (c)(1),
(2) Date: Mar. 11, 2015

(87) PCT Pub. No.: WO2014/041768
PCT Pub. Date: Mar. 20, 2014

(65) Prior Publication Data
US 2015/0229168 A1 Aug. 13, 2015

(30) Foreign Application Priority Data
Sep. 11, 2012 (JP) .................................. 2012-199466

(51) Int. Cl.
*H02K 55/04* (2006.01)
*H02K 1/24* (2006.01)
(Continued)

(52) U.S. Cl.
CPC ................ *H02K 1/24* (2013.01); *H02K 1/02* (2013.01); *H02K 3/18* (2013.01); *H02K 55/04* (2013.01); *Y02E 40/625* (2013.01)

(58) Field of Classification Search
CPC ............ H02K 55/04; H02K 1/02; H02K 1/14; H02K 1/24; H02K 3/24; Y02E 40/625
(Continued)

(56) References Cited

U.S. PATENT DOCUMENTS 4,058,746 A   11/1977 Mole et al.
5,777,420 A * 7/1998 Gamble ................ H02K 55/04
                                                   310/10
(Continued)

FOREIGN PATENT DOCUMENTS

EP   0805545 A1 * 11/1997 ............ H02K 55/04
GB   1 453 784   10/1976
(Continued)

OTHER PUBLICATIONS

Nov. 26, 2013 International Search Report issued in International Application No. PCT/JP2013/005257.
(Continued)

*Primary Examiner* — Burton Mullins
(74) *Attorney, Agent, or Firm* — Oliff PLC

(57) ABSTRACT

Superconducting field poles each include a superconducting coil body formed by spirally winding a superconducting wire material, a ferromagnetic outer magnetic field-deflecting member arranged on an end face of the superconducting coil body at a radially outer side of a rotor, and a ferromagnetic inner magnetic field-deflecting member arranged on an end face of the superconducting coil body at a radially inner side of the rotor.

8 Claims, 14 Drawing Sheets

(51) Int. Cl.
*H02K 1/02* (2006.01)
*H02K 3/18* (2006.01)

(58) Field of Classification Search
USPC ............... 310/216.098, 216.079, 216.091
See application file for complete search history.

(56) References Cited

U.S. PATENT DOCUMENTS

| | | | |
|---|---|---|---|
| 6,700,274 B2 * | 3/2004 | Gamble | H02K 55/04 |
| | | | 310/179 |
| 2005/0082935 A1 * | 4/2005 | Frank | H02K 55/04 |
| | | | 310/216.001 |
| 2010/0098576 A1 | 4/2010 | Yoshizawa et al. | |

FOREIGN PATENT DOCUMENTS

| | | |
|---|---|---|
| JP | S57-162942 A | 10/1982 |
| JP | H07142245 A | 6/1995 |
| JP | H11-031614 A | 2/1999 |
| JP | 2003-158009 A | 5/2003 |
| JP | 2008-231463 A | 10/2008 |
| WO | WO 0120756 A1 * | 3/2001 ............ H02K 55/04 |
| WO | 03/009454 A2 | 1/2003 |

OTHER PUBLICATIONS

Apr. 1, 2016 Extended Search Report issued in European Patent Application No. 13836543.2.

* cited by examiner

| ANALYSIS MODEL | SHAPES OF MAGNETIC-FIELD DEFLECTING MEMBERS | | VOLUME RATIO (CROSS-SECTIONAL AREA RATIO) | EFFECTS [%] (WITH ANALYSIS MODEL A USED AS REFERENCE) | |
|---|---|---|---|---|---|
| | OUTER | INNER | OUTER/INNER | MAXIMUM MAGNETIC FIELD OF WIRE MATERIAL | MOTOR OUTPUT |
| O | ABSENT | ABSENT | — | 0 | 0 |
| A | RECTANGULAR | RECTANGULAR | 1.00 | 6.57 | 8.71 |
| B | RECTANGULAR | RECTANGULAR | 0.83 | 8.71 | 9.23 |
| C | TRAPEZOID | RECTANGULAR | 0.77 | 8.71 | 11.66 |
| D | TRAPEZOID | TRAPEZOID | 0.92 | 11.30 | 11.20 |

SUPERCONDUCTING FIELD POLE

TECHNICAL FIELD

The present invention relates to a superconducting field pole.

BACKGROUND ART

An electrical rotating machine is typically an electric motor or a power generator made up of a stator, a rotor, and a housing supporting the rotor and the stator. The electrical rotating machine can be classified into a normal conducting electrical rotating machine using normal conducting coils, which do not cause a superconducting phenomenon, and a superconducting electrical rotating machine using superconducting coils, which cause the superconducting phenomenon. The superconducting electrical rotating machine has a so-called radial gap type structure in which mainly, a cylindrical stator and a plurality of field poles (superconducting field poles) are arranged. In the stator, an armature winding of a plurality of phases using a normal conducting winding is arranged in a circumferential direction, and the plurality of field poles using superconducting coils are disposed coaxially with the stator in an internal space of the stator, and are arranged in the circumferential direction so as to be opposed to the plurality of phases of the armature winding of the stator. In the rotor of the superconducting electrical rotating machine, a rotor core as an inner cylindrical body and a casing as an outer cylindrical body surrounding an outer circumference of the rotor core are rotatably supported by a rotor shaft joined on a central axis of the rotor core. Moreover, the rotor of the superconducting electrical rotating machine is formed with a decompression space between the rotor core and the casing, and in this decompression space, the superconducting field poles are arranged.

As shown in FIG. 14, a superconducting field pole 28 has a structure in which a plurality of racetrack type coils 29 are laminated, the racetrack type coils 29 being each made up of a pair of linear portions 30a, 30b opposed to each other, and a pair of arc portions 30c, 30d opposed to each other and joining both ends of the linear portions 30a, 30b. Specifically, the superconducting field pole 28 shown in FIG. 14 is a superconducting coil body in which four racetrack type coils 29a to 29d are laminated, and the racetrack type coils 29a to 29d of respective layers each have an air-cored structure, which does not configure a so-called magnetic circuit, obtained by spirally (like mosquito repelling incense) winding a tape-like (belt-like) superconducting wire material 31 like a pancake around an oval winding frame not shown so as to form a racetrack shape. Further, a cross section of each of the racetrack type coils 29a to 29d shown in FIG. 14 has a double-layered structure accompanying double pancake winding. That is, the two layers of the superconducting wire material 31 are formed in a lamination direction of the racetrack type coils 29 so that a longitudinal direction (a parallel direction) of a cross section of the superconducting wire material 31 is the lamination direction of the racetrack type coils 29, and a short direction (a vertical direction) of the cross section of the superconducting wire material 31 is a radial direction of the racetrack type coils 29. In addition, the cross section has a shape in which the relevant two layers of the superconducting wire material 31 are arrayed from a radially inner side to a radially outer side of each of the racetrack type coils 29. The racetrack type coils 29 may each have a single-layered structure by single pancake winding besides the double-layered structure by the double pancake winding.

In the above-described structure of the superconducting field pole 28, a critical current, which is one of performance measures of the superconducting wire material 31, depends on intensity of a magnetic field (hereinafter, referred to as a vertical magnetic field) acting in a direction vertical to a tape broad width face (main face) of the superconducting wire material 31 (in the radial direction of the racetrack type coil), so that there has been known a problem that as the intensity of the vertical magnetic field becomes larger, the critical current is reduced. FIG. 15 is a schematic view indicating a situation where the vertical magnetic field occurs.

On the other hand, in Patent Literature 1, (PTL1), Japanese Unexamined Patent Application Publication No. H7-142245, there has been disclosed a high-temperature superconducting magnet to which flanges each made of iron such as, for example, a silicon steel sheet and the like as ferromagnetic bodies are attached at both ends of a high-temperature superconducting coil body in which a plurality of high-temperature superconducting coil units using a high-temperature superconducting tape material are laminated. In this manner, when the ferromagnetic bodies are attached at both the ends of the high-temperature superconducting coil body, a magnetic field of a coil winding portion is directed to the ferromagnetic bodies. As a result, it is said that as compared with a high-temperature superconducting magnet to which no ferromagnetic body is attached, in the high-temperature superconducting magnet to which the ferromagnetic bodies are attached, reduction of a critical current density by the magnetic field of the high-temperature superconducting tape material is small, and a generated magnetic field of the high-temperature superconducting magnet is increased.

SUMMARY OF INVENTION

Technical Problem

The superconducting coil disclosed in PTL 1 is used in the magnet. Accordingly, measures for suppressing reduction of the critical current in the vertical magnetic field in the radial gap type superconducting electrical rotating machine are not mentioned at all. Moreover, the superconducting coil disclosed in PTL 1 presupposes use in only a single pole, and does not presuppose use as the superconducting field poles of a plurality of poles in a radial gap type superconducting electrical rotating machine. Thus, mutual magnetic influence among the plurality of poles, and magnetic linkage between the superconducting field pole on the rotor side and the armature on the stator side are not considered, and there has been room for improvement on enhancement of the critical current and output of the radial gap type superconducting motor.

The present invention is achieved to solve the above-described problems, and a first object is to suppress reduction of a critical current by a vertical magnetic field in a radial gap type superconducting electrical rotating machine in which a rotor is made superconducting, and a stator is made normal-conducting. Moreover, a second object thereof is to enhance the critical current, in a radial gap type superconducting electrical rotating machine in which a rotor is made superconducting and a stator is made normal-conducting, by reducing the vertical magnetic field of a wire material in view of mutual influence by another superconducting field pole, and to enhance output by increasing an interlinkage magnetic flux that crosses both a superconducting field pole of the rotor and an armature winding of the stator.

Solution to Problem

In order to solve the above-described problems, superconducting field poles according to an aspect of the present invention are a plurality of superconducting field poles arranged in a circumferential direction so as to correspond to a plurality of phases of an armature winding in a rotor of a superconducting electrical rotating machine, the rotor being disposed coaxially with a stator in an internal space of the cylindrical stator in which the armature winding of the plurality of phases is arranged in the circumferential direction, each of the superconducting field poles including a superconducting coil body formed by spirally winding a superconducting wire material, an outer magnetic field-deflecting member more ferromagnetic than the superconducting coil body, the outer magnetic field-deflecting member being arranged on or in the vicinity of an end face of the superconducting coil body at a radially outer side of the rotor, and an inner magnetic field-deflecting member more ferromagnetic than the superconducting coil body, the inner magnetic field-deflecting member being arranged on or in the vicinity of an end face of the superconducting coil body at a radially inner side of the rotor.

Here, "a central axis of . . . is directed to a radial direction" means "an extending direction of the central axis of . . . coincides with the radial direction". Moreover, "arranged on or in the vicinity of an end face" means "in contact with the end face, or adjacent to the end face". A case where the outer magnetic field-deflecting member and the inner magnetic field-deflecting member are each arranged through a gap on each of the end faces of the superconducting coil body refers to the case where each of the outer and inner magnetic field-deflecting members is not in contact with the end face, but adjacent to the same.

According to the configuration of the superconducting field pole, in the radial gap type superconducting electrical rotating machine, the ferromagnetic outer and inner magnetic field-deflecting members attract the magnetic flux directed to the superconducting coil body, which can reduce a vertical magnetic field of the wire material, and enhance a critical current. Moreover, the existence of the ferromagnetic bodies in the vicinity of the superconducting coil body increases a generated magnetic flux, and increase of an interlinkage magnetic flux that crosses both the superconducting field pole of the rotor and the armature winding of the stator can enhance output.

In each of the superconducting field poles, a volume of the inner magnetic field-deflecting member may be larger than a volume of the outer magnetic field-deflecting member.

According to the above-described configuration of the superconducting field pole, in view of influence by magnetic field distribution of the superconducting field pole adjacent in the circumferential direction of the rotor (hereinafter, referred to as the adjacent pole), the volume of the inner magnetic field-deflecting member, which is closer to the adjacent pole (the influence is stronger), is made larger than the volume of the outer magnetic field-deflecting member, which is farther from the adjacent pole (the influence is weaker). This can reduce the influence by the magnetic field distribution of the adjacent pole. Moreover, as a result, the existence of the ferromagnetic material in the vicinity of the superconducting coil body increases the generated magnetic flux, and intensity of a magnetic flux directed from the end face of the superconducting coil laminated body at the radially inner side of the rotor to the end face at the radially outer side, and in turn, intensity of a magnetic flux directed from the superconducting coil laminated body of the rotor to the armature winding of the stator can be made larger. Moreover, the vertical magnetic field of the superconducting wire material in an outer circumferential portion of the superconducting coil laminated body, which is close to the adjacent pole, can be reduced, and the magnetic flux can be deflected from the superconducting field pole to the armature winding in the outer circumferential portion.

For these reasons, in the radial gap type superconducting electrical rotating machine, in view of the mutual influence by another superconducting field pole, the vertical magnetic field of the wire material can be reduced to thereby enhance the critical current, and the interlinkage magnetic flux that crosses both the superconducting field pole of the rotor and the armature winding of the stator can be increased to enhance output.

In each of the superconducting field poles, the outer magnetic field-deflecting member may be arranged throughout the entire end face of the superconducting coil laminated body at the radially outer side of the rotor, and may be formed into a plate shape in which a central portion is thicker than an outer circumferential portion. Here, the present invention is not limited to the shape in which the central portion is thicker and the outer circumferential portion is thinner throughout an entire circumference of the end face of the superconducting coil laminated body, but in at least a partial range of the entire circumference of the end face, the central portion may be thicker and the outer circumferential portion may be thinner.

According to the above-described configuration of the superconducting field pole, the outer magnetic field-deflecting member having the plate shape in which the central portion is thicker than the outer circumferential portion (a conical shape, a truncated conical shape, a hemispherical shape, and a shape in which a small-diameter cylindrical body is provided continuously and coaxially on one end face of a large-diameter cylindrical body, and so on) is employed, which can reduce the vertical magnetic field of the superconducting wire material constituting racetrack type coils of respective layers of the superconducting coil laminated body, and deflect the magnetic field distribution of the superconducting coil laminated body to a direction where the magnetic field more easily crosses the armature. In other words, a leakage magnetic flux can be used as a valid magnetic flux.

In each of the superconducting field poles, the outer magnetic field-deflecting member may be formed so that the central portion has a predetermined thickness, and the thickness becomes smaller from the central portion to the outer circumferential portion.

According to the above-described configuration of the superconducting field pole, the shape of the outer magnetic field-deflecting member is made a tapered shape (a truncated conical shape or the like) in which the thickness becomes smaller from the central portion to the outer circumferential portion, by which the outer magnetic field-deflecting member having the plate shape in which the central portion is thicker than the outer circumferential portion can be easily manufactured.

In each of the superconducting field poles, the inner magnetic field-deflecting member may be arranged throughout the entire end face of the superconducting coil laminated body at the radially inner side of the rotor, and may be fondled into a plate shape in which a central portion is thicker than an outer circumferential portion.

According to the above-described configuration of the superconducting field pole, similar to the outer magnetic field-deflecting member, the inner magnetic field-deflecting member having the plate shape in which the central portion is thicker than the outer circumferential portion (a conical shape, a truncated conical shape, a hemispherical shape, and a shape in which a small-diameter cylindrical body is provided continuously and coaxially on one end face of a large-diameter cylindrical body, and so on) is employed, which can further reduce the vertical magnetic field of the superconducting wire material constituting the racetrack type coils of the respective layers of the superconducting coil laminated body, and deflect the magnetic field distribution of the superconducting coil laminated body to the direction where the magnetic field more easily crosses the armature. In other words, the leakage magnetic flux can be used as the valid magnetic flux.

In each of the superconducting field poles, the inner magnetic field-deflecting member may be formed so that the central portion has a predetermined thickness, and the thickness becomes smaller from the central portion to the outer circumferential portion.

According to the above-described configuration of the superconducting field pole, the shape of the inner magnetic field-deflecting member is made a tapered shape (a truncated conical shape or the like) in which the thickness becomes smaller from the central portion to the outer circumferential portion, by which the inner magnetic field-deflecting member having the plate shape in which the central portion is thicker than the outer circumferential portion can be easily manufactured.

In each of the superconducting field poles, the inner magnetic field-deflecting member and the outer magnetic field-deflecting member may be made of a nano-crystal soft magnetic material manufactured by crystallizing an amorphous alloy obtained by compositely adding copper (Cu) and niobium (Nb) to an Fe—Si—B compound.

According to the above-described configuration of the superconducting field pole, the inner magnetic field-deflecting member and the outer magnetic field-deflecting member can be made lightweight.

In each of the above-described superconducting field poles, both the outer magnetic field-deflecting member and the inner magnetic field-deflecting member may have a shape in which no hole is opened in a central portion when seen from an extending direction of a central axis of the superconducting coil body.

According to the above-described configuration of the superconducting field pole, as compared with a case where at least one of the outer magnetic field-deflecting member and the inner magnetic field-deflecting member has a shape in which a hole is opened in the central portion when seen from the extending direction of the central axis of the superconducting coil body, the magnetic flux directed from the superconducting field pole to the armature winding can be deflected so as to easily pass the central portions of the inner magnetic field-deflecting member and the outer magnetic field-deflecting member. This can further increase the interlinkage magnetic flux that crosses both the superconducting field pole of the rotor and the armature winding of the stator, and further enhance the output of the superconducting electrical rotating machine.

In each of the superconducting field poles, at least one of the outer magnetic field-deflecting member and the inner magnetic field-deflecting member may have a shape in which a hole is opened in a central portion when seen from an extending direction of a central axis of the superconducting coil body.

According to the above-described configuration of the superconducting field pole, as compared with the case where both the outer magnetic field-deflecting member and the inner magnetic field-deflecting member have the shape in which no hole is opened in the central portion when seen from the extending direction of the central axis of the superconducting coil body, the outer magnetic field-deflecting member or the inner magnetic field-deflecting member, which has the hole opened, more attracts the magnetic flux directed to the superconducting coil body, which can more reduce a maximum portion of the vertical magnetic field of the wire material constituting the superconducting field pole, and in turn, more enhance the critical current.

Advantageous Effects of Invention

According to the present invention, firstly, in a radial gap type superconducting electrical rotating machine in which a rotor is made superconducting, and a stator is made normal-conducting, reduction of a critical current by a vertical magnetic field can be suppressed. Secondly, in the radial gap type superconducting electrical rotating machine in which the rotor is made superconducting, and the stator is made normal-conducting, in view of mutual influence of another superconducting field pole, the reduction of the vertical magnetic field of the wire material can enhance the critical current, and increase of an interlinkage magnetic flux that crosses both the superconducting field pole of the rotor and the armature winding of the stator can enhance output.

DESCRIPTION OF EMBODIMENTS (Viewpoints of the Present Invention)

The present inventors firstly have focused on a configuration peculiar to a radial gap type superconducting electrical rotating machine in which a rotor is made superconducting, and a stator is made normal-conducting, and have considered arrangement of magnetic field-deflecting members appropriate for this peculiar configuration.

Secondly, in the superconducting field poles of the radial gap type superconducting electrical rotating machine in which the rotor is made superconducting, and the stator is made normal-conducting, the inventors have focused on shapes of the magnetic field-deflecting members that can enhance a critical current by reducing a vertical magnetic field of a wire material in view of mutual influence by another superconducting field pole, and enhance output by increasing an interlinkage magnetic flux that crosses both the superconducting field pole of the rotor and an armature winding of the stator.

Figure 3:
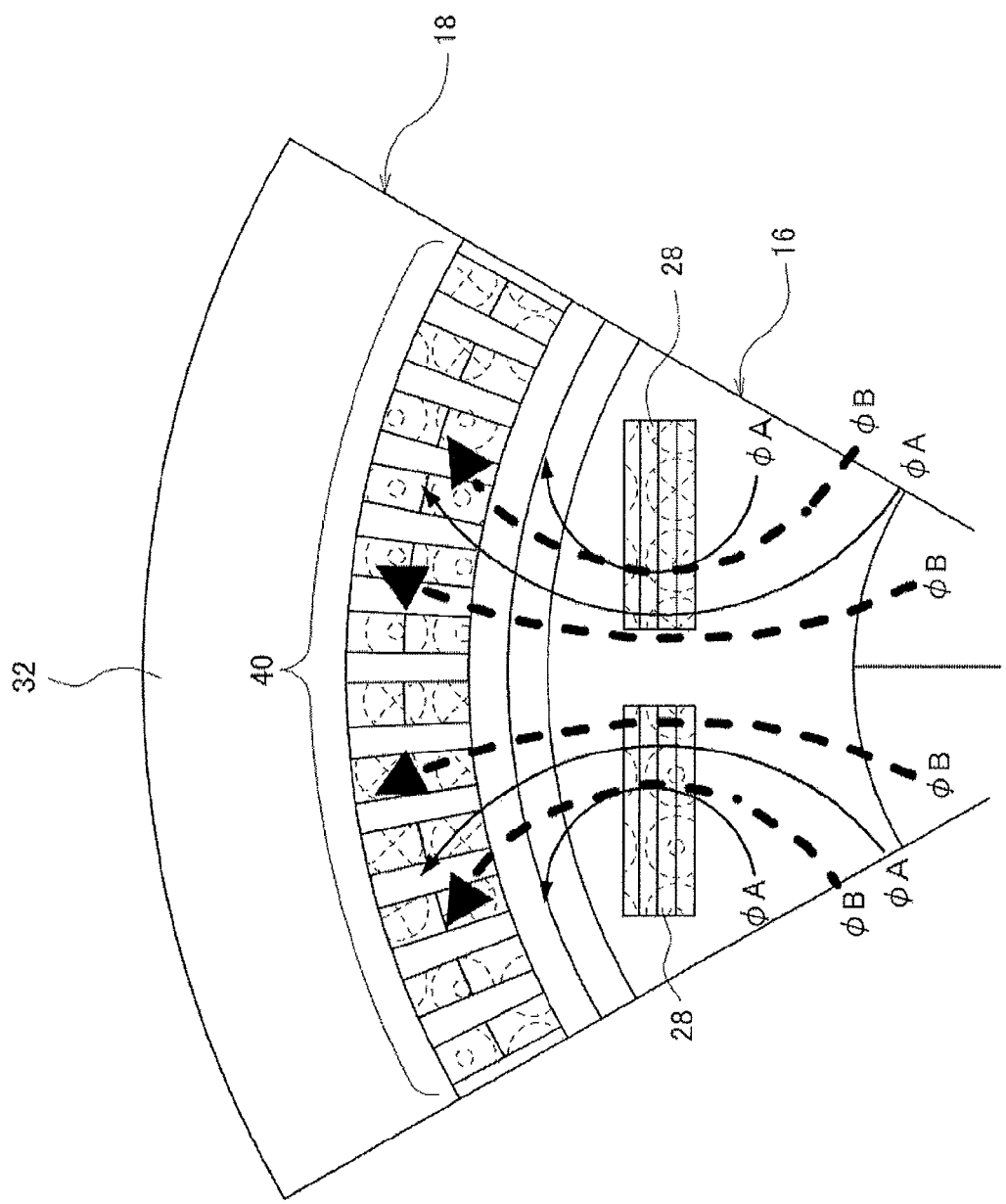
FIG. 3 is a view for describing an interlinkage magnetic flux to be realized by shapes of magnetic field-deflecting members in the present invention, the interlinkage magnetic flux crossing both the superconducting field pole and an armature winding.

Hereinafter, the viewpoints of the shapes of the magnetic field-deflecting members will be described with reference to FIGS. 3 and 4. FIG. 3 is a view for describing the interlinkage magnetic flux to be realized by shapes of magnetic field-deflecting members in the present invention, the interlinkage magnetic flux crossing both the superconducting field pole and an armature winding FIG. 4 is a view for describing that magnetic field distribution of the superconducting field pole is affected by magnetic field distribution of another adjacent superconducting field pole, which leads to an idea of the shapes of the magnetic field-deflecting members in the present invention.

First, as shown in FIG. 3, a plurality of superconducting field poles 28 are arranged in a circumferential direction so as to correspond to a plurality of phases of an armature winding 40 in a rotor 16 of a superconducting electrical rotating machine, the rotor 16 being disposed coaxially with a cylindrical stator 18 in an internal space of the stator 18, in which the armature winding 40 of the plurality of phases is arranged in an inner circumferential direction of a cylindrical back yoke 32. The superconducting field poles 28 are each a non-cored field pole. Here, in order to increase the interlinkage magnetic flux that crosses both the superconducting field pole 28 of the rotor 16 and the armature winding 40 of the stator 18, it can be considered to intensify a magnetic field of the superconducting field pole 28 as a first measure, and to deflect the magnetic field distribution of the superconducting field pole 28 to a direction where it easily crosses the armature winding 40 as a second measure.

Referring to FIG. 3, in the case of the superconducting field pole 28 not provided with the magnetic field-deflecting member, the interlinkage magnetic flux that crosses both the superconducting field pole and the armature winding 40 is $\phi A$ indicated by solid curves with arrows (vector lines) in FIG. 3. Since an amount of the interlinkage magnetic flux $\phi A$ that is directed to the armature winding 40 is small because of a large curvature, a magnetic field vertical to a broad width face (a main face) (refer to FIG. 14) of the superconducting wire material of racetrack type coils constituting respective layers of the superconducting field pole is made larger. Accordingly, in order to take the foregoing first measure and the foregoing second measure, the shapes of the magnetic field-deflecting members provided in the superconducting field pole 28 have been considered so that the interlinkage magnetic flux $\phi A$ indicated by the solid curves with arrows in FIG. 3 becomes an interlinkage magnetic flux $\phi B$ in which an amount directed to the armature winding 40 is large because a curvature is small as indicated by dotted curves with arrows in FIG. 3.

Figure 4:
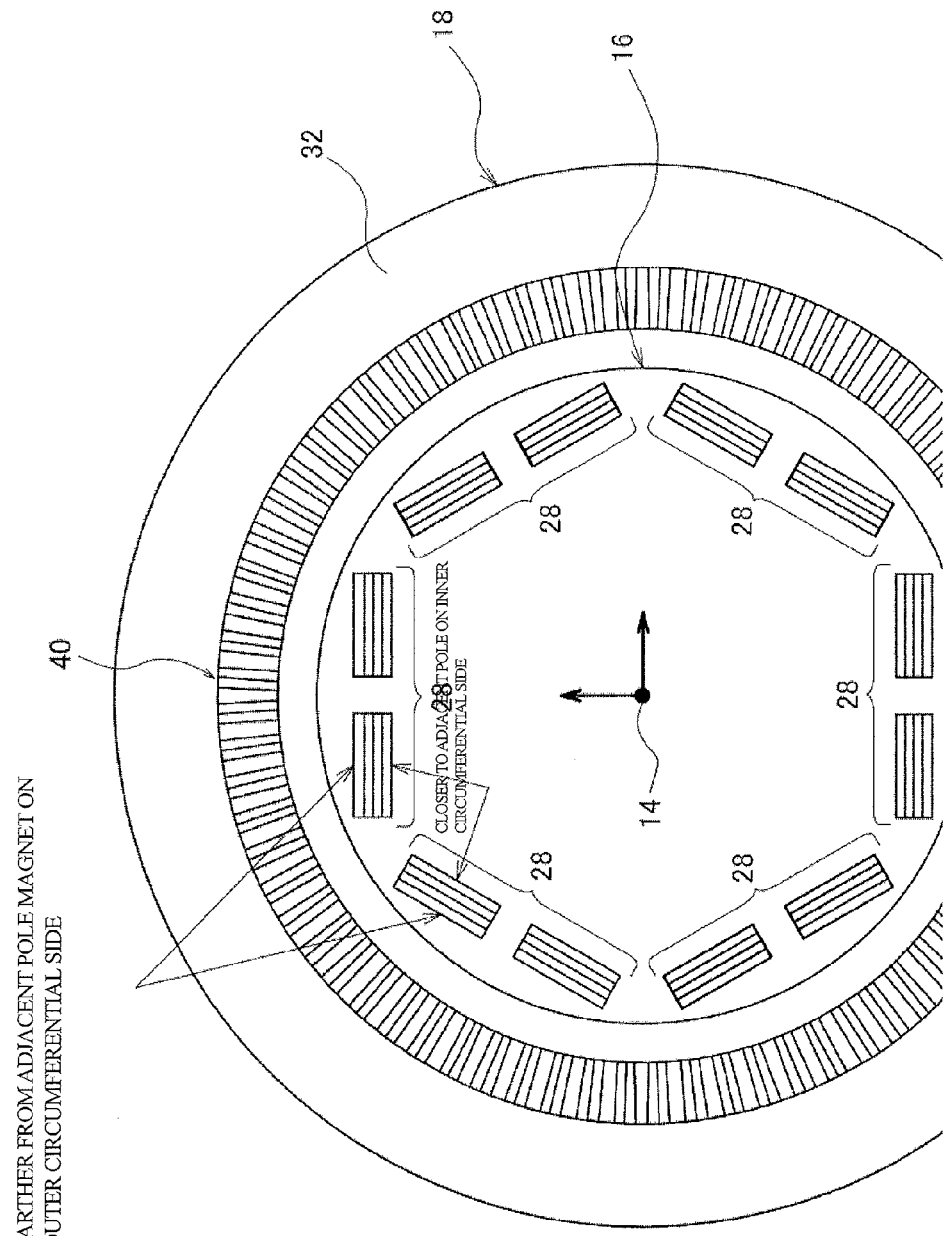
FIG. 4 is a view for describing that magnetic field distribution of the superconducting field pole is affected by magnetic field distribution of another adjacent superconducting field pole, which leads to an idea of the shapes of the magnetic field-deflecting members in the present invention.

In this consideration process, particularly, the present inventors have focused on the fact that as shown in FIG. 4, the magnetic field distribution of each of the superconducting field poles 28 arranged in the circumferential direction of the rotor 16 is affected by the magnetic field distribution of the superconducting field pole 28 adjacent in the circumferential direction of the rotor 16 (hereinafter, referred to as an adjacent pole). Here, as to a positional relationship between the superconducting field poles 28 as a certain pole and the adjacent pole, it is found that a distance between outer circumferential portions of respective end faces of the certain pole and the adjacent pole at a radially inner side (inner circumferential side in FIG. 4) of the rotor 16 is smaller than a distance between outer circumferential portions of respective end faces of the certain pole and the adjacent pole at a radially outer side (outer circumferential side in FIG. 4) of the rotor 16. That is, it can be said that in the certain pole, the outer circumferential portion of the end face at the radially inner side of the rotor 16 is strongly affected by the magnetic field distribution from the adjacent pole as compared with the outer circumferential portion of the end face at the radially outer side of the rotor 16. Consequently, based on a first consideration result, the shapes of the magnetic field-deflecting members that can suppress the influence by the magnetic field distribution from the adjacent pole will be proposed in the following embodiments.

Hereinafter, the embodiments of the present invention will be described with reference to the drawings. In the following, through all the drawings, the same or equivalent elements will be given the same reference numerals, and redundant description will be omitted.

(Embodiment 1)

[Structural Example of Superconducting Electrical Rotating Machine]

Figure 1:
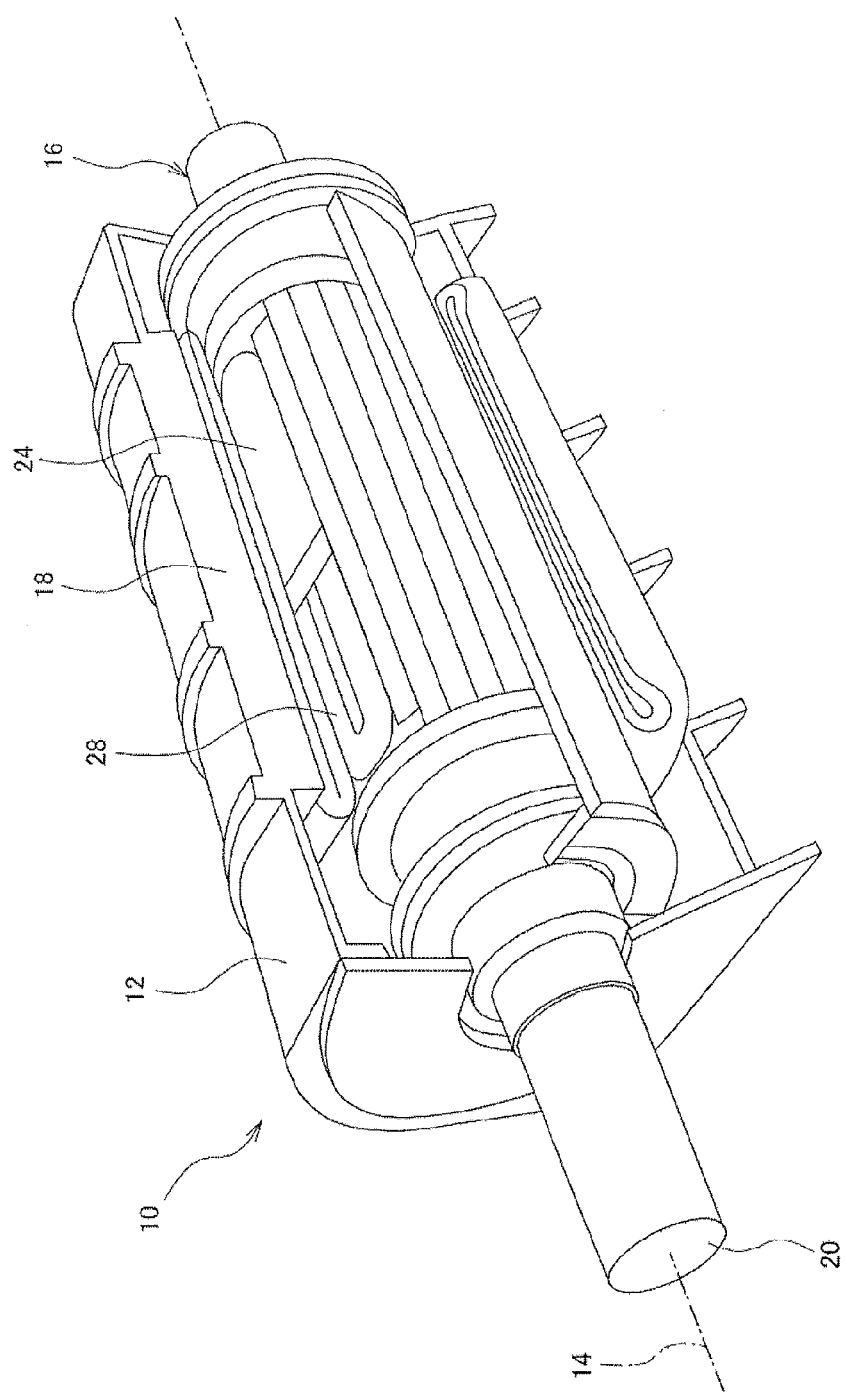
FIG. 1 is a view showing an external appearance example and an internal structural example of a superconducting electrical rotating machine including superconducting field poles according to Embodiment 1 of the present invention.
Figure 2:
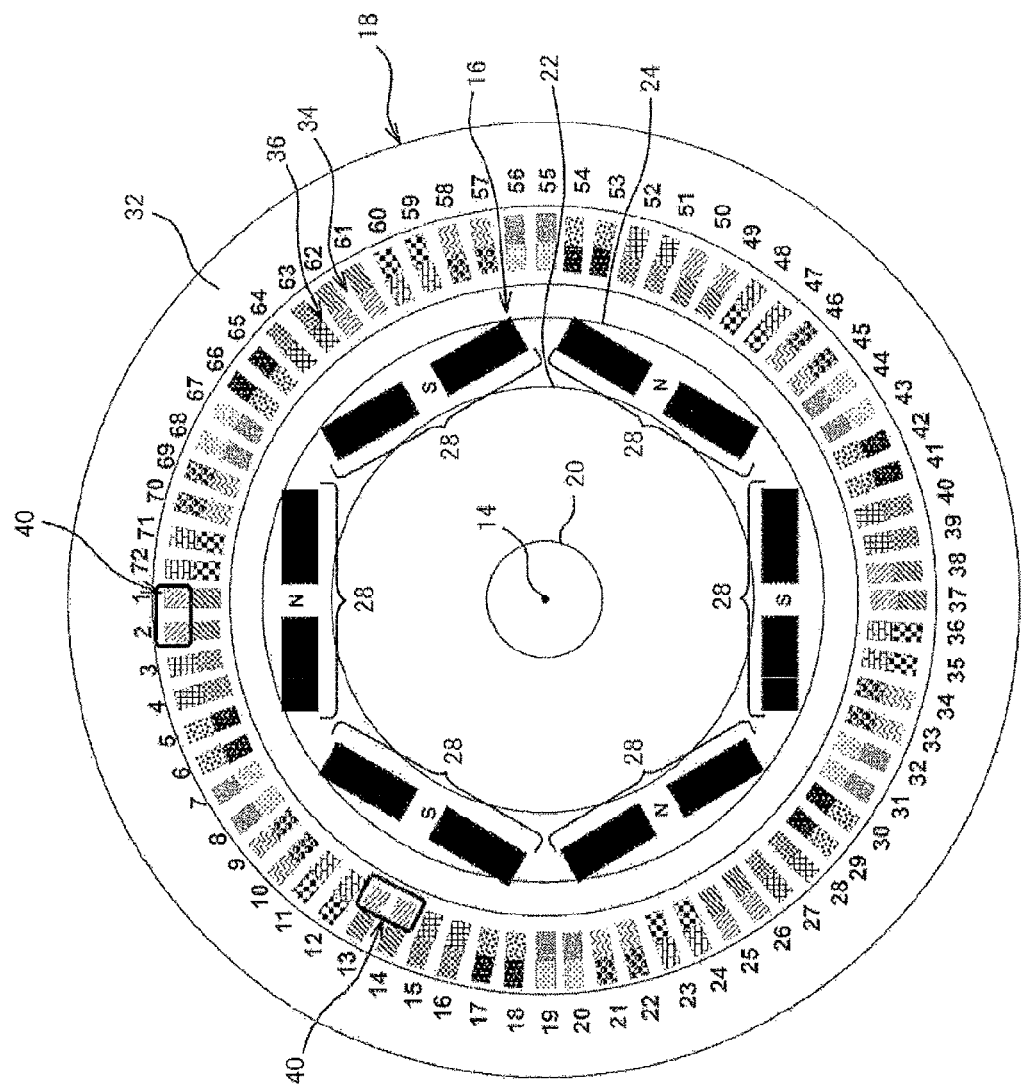
FIG. 2 is a cross-sectional view schematically showing a configuration example of the superconducting electrical rotating machine including the superconducting field poles according to Embodiment 1 of the present invention.

FIG. 1 is a view showing an external appearance example and an internal structural example of a superconducting electrical rotating machine according to Embodiment 1 of the present invention. FIG. 2 is a cross-sectional view schematically showing a configuration example of the superconducting electrical rotating machine according to Embodiment 1 of the present invention. The superconducting electrical rotating machine shown in FIG. 2 has six phases (e.g., a U phase, a V phase, a W phase, an X phase, a Y phase, and a Z phase), six poles (permanent magnet fields), and 72 slots. It is obvious that the number of phases and the number of poles of the superconducting electrical rotating machine are arbitrary, as long as the number of phases is two or more, and the number of poles is four or more. Moreover, in FIG. 2, for simplification of description, an outer magnetic field-deflecting member and an inner magnetic field-deflecting member are not shown. The outer magnetic field-deflecting member and the inner magnetic field-deflecting member will be described in detail later.

A superconducting electrical rotating machine 10 shown in FIG. 1 has a radial gap structure in which a rotor 16 is made superconducting (the superconducting field pole), and a stator 18 is made normal-conducting (the normal conducting armature winding). The superconducting electrical rotating machine 10 has a tubular housing 12, the rotor 16, and the stator 18 disposed inside the housing 12 so as to surround a circumference of the rotor 16.

The rotor 16 has a central axis 14, and a rotor shaft 20 rotatably supported by the housing 12. The rotor shaft 20 supports a rotor core 22, which is an inner cylindrical body with the central axis 14 as a center, and a casing 24, which is an outer cylindrical body. A tubular vacuum heat insulation space is constructed between the rotor core 22 and the casing 24, and inside this vacuum heat insulation space, there are arranged non-cored superconducting field poles 28 forming a plurality of magnetic pole pairs at regular intervals along a circumferential direction of the vacuum heat insulation space. In FIG. 2, arrangement of the superconducting field poles 28 having three magnetic pole pairs as a case of six poles is shown. Moreover, in the rotor 16, although not illustrated, a cooling structure to cool the superconducting field poles 28 arranged in the foregoing vacuum heat insulation space is provided. As a refrigerant used in this cooling structure to cool the superconducting field poles 28, for example, helium gas can be employed. The rotor core 22 is formed by cutting a forged material of a solid columnar body made of a nonmagnetic material excellent in low-temperature characteristics, for example, SUS316. The casing 24 preferably includes one or a plurality of heat insulator layers excellent in heat insulation performance to low temperature.

The stator 18 has a back yoke 32 formed into a tubular shape by laminating a plurality of annular electromagnetic steel sheets (e.g., silicon steel sheets) in an axial direction parallel to the central axis 14 of the stator 18 (the central axis of the rotor shaft 20 as well). The back yoke 32 is divided, for example, into a plurality of sections having a thickness of a predetermined lamination interval in the axial direction. Teeth 34 disposed at intervals in a circumferential direction of the back yoke 32 are provided on an inner circumferential surface of each of the sections of the back yoke 32 so as to extend toward the central axis 14 of the back yoke 32 (the central axis of the rotor shaft 20 as well). Between the teeth 34 adjacent to one another in the circumferential direction of the back yoke 32 in the inner circumferential surface of each of the sections of the back yoke 32, a slot 36 (a depressed groove) having a substantially rectangular cross section in a direction parallel to the central axis 14 of the stator 18 is extended.

The teeth 34 are formed of a nonmagnetic material, for example, a rigid resin material having a high mechanical strength such as fiber reinforced plastic (FRP). Besides this, the teeth 34 may be formed of a nonmagnetic metal, for example, stainless steel. Regardless of the material, the teeth 34 are formed by laminating a plurality of thin nonmagnetic sheets in the direction parallel to the central axis 14 of the rotor 18. In this manner, forming the teeth 34 of the nonmagnetic material can prevent an eddy current from be generated inside the teeth 34 by movement of a magnetic field accompanying rotation of the rotor 16, and with this, a cooling structure of the teeth 34 is unnecessary. Moreover, concentration of the magnetic flux on radially inner end portions (end portions opposed to the rotor 16) of the teeth 34 can be avoided.

In each of the slots 36, a slot number for identifying each one is given. FIG. 2 shows a method of giving the slot numbers when the number of slots is 72. In each of the slots 36, in a radially outer region and a radially inner region of the housing 12, an in-phase unit winding pair of the armature winding (stator winding) 40 is arranged. When seen from axially one end side of the back yoke 32, one end (a starting end) of the unit winding pair appears in the radially outer region and another end (a terminal end) of the unit winding pair appears in the radially inner region. Accordingly, a total number of the unit windings of the armature winding 40 is 72, that is, the same as the number of the slots. Hereinafter, the unit windings of the armature winding 40 arranged in the respective slots 36 will be identified, using reference numerals 40(1), 40(2), . . . , 40(72), and the respective slots 36 will be described, using reference numerals 36(1), 36(2), . . . , 36(72).

The armature winding 40, for example, has first Y (star) connection made up of a U-phase winding, a V-phase winding, and a W-phase winding, which are different from one another by 120° in phase, and second Y (star) connection made up of an X-phase winding, a Y-phase winding, and a Z-phase winding, which are different from one another by 120° in phase, and is arranged so that the phase is shifted by 60° from the respective phase windings of the first Y connection, and further, a neutral point of the first Y connection and a neutral point of the second Y connection are connected to each other. For example, the U-phase winding is arranged in the slot pairs of serial numbers adjacent to each other, and in the slot pairs appearing at intervals of 12 slots. Specifically, the U-phase winding is in the respective slots 36(1), 36(2), 36(13), 36(14), 36(25), 36(27), 36(37), 36(38), 36(49), 36(50), 36(61), 36(62) of the slot numbers 1, 2, 13, 14, 25, 26, 37, 38, 49, 50, 61, 62. That is, the U-phase winding is made up by connecting the 12 unit windings 40(1), 40(2), 40(13), 40(14), 40(25), 40(26), 40(37), 40(38), 40(49), 40(50), 40(61), 40(62) in series.

[Configuration Example of Superconducting Field Pole]

Figure 5:
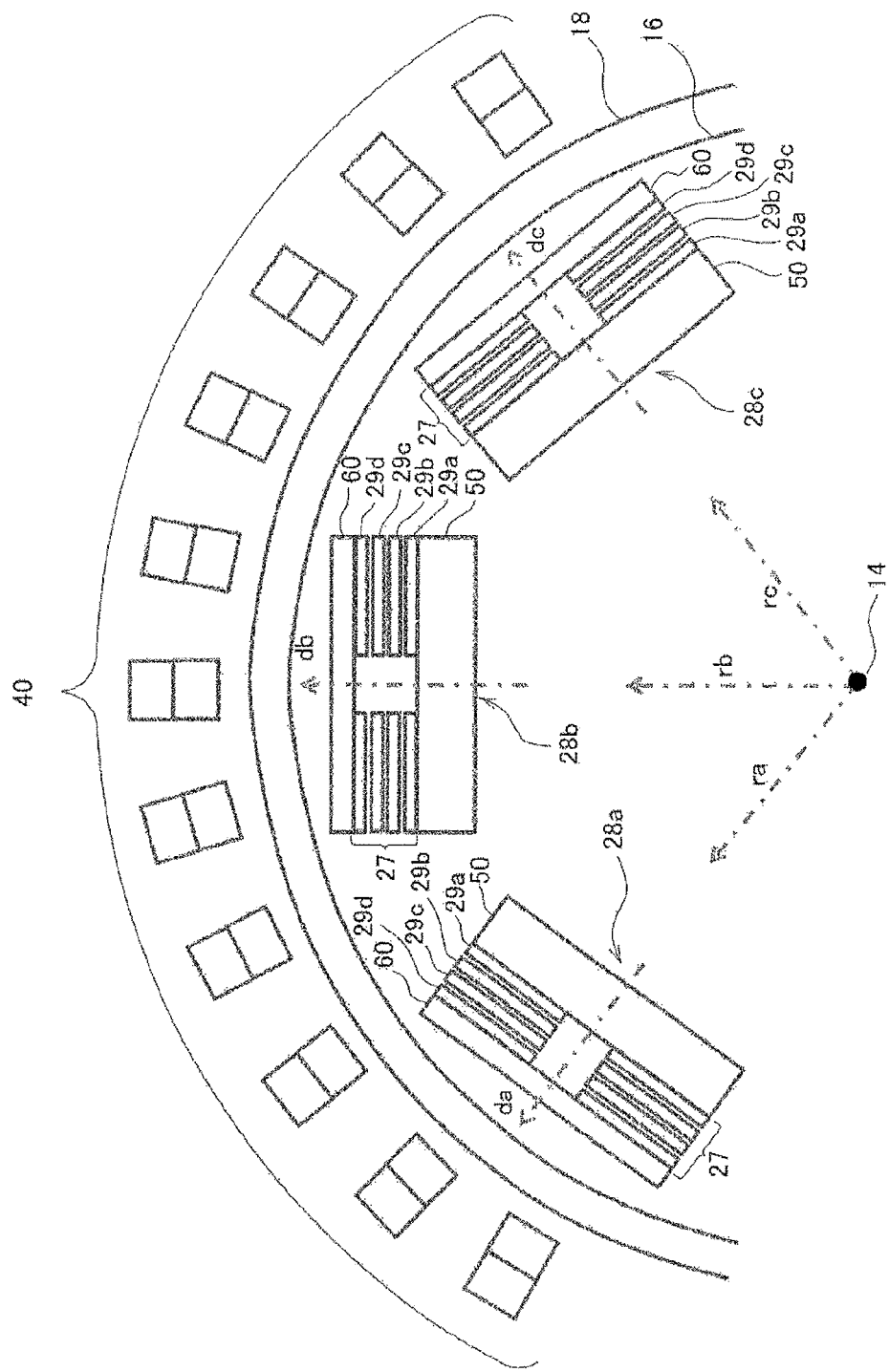
FIG. 5 is a view showing a configuration example of the superconducting field pole according to Embodiment 1 of the present invention.

FIG. 5 is a view showing a configuration example of the superconducting field poles 28 according to Embodiment 1 of the present invention.

First, a configuration example before an outer magnetic field-deflecting member 60 and an inner magnetic field-deflecting member 50 are provided in each of the superconducting field poles 28 shown in FIG. 5 will be described with reference to FIG. 14 again.

Figure 14:
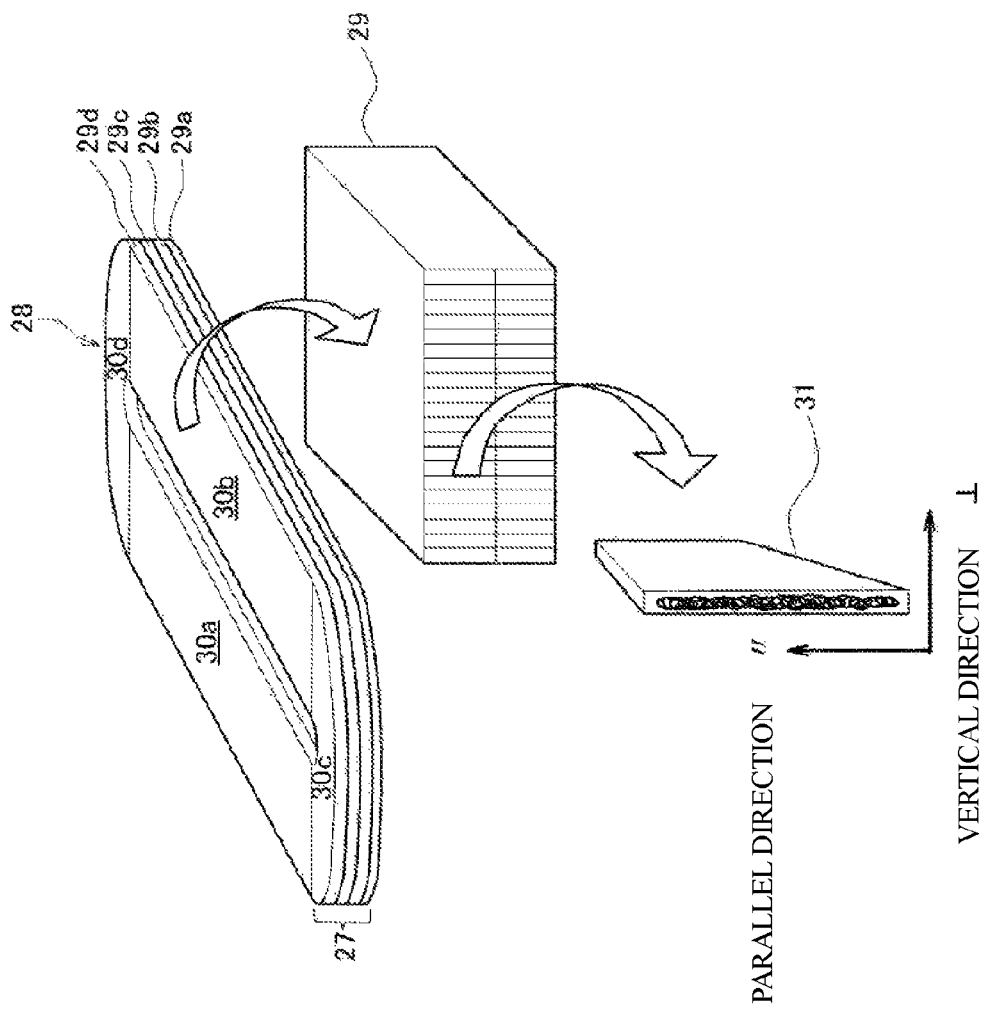
FIG. 14 is a view showing a configuration example of the superconducting field pole.
Figure 15:
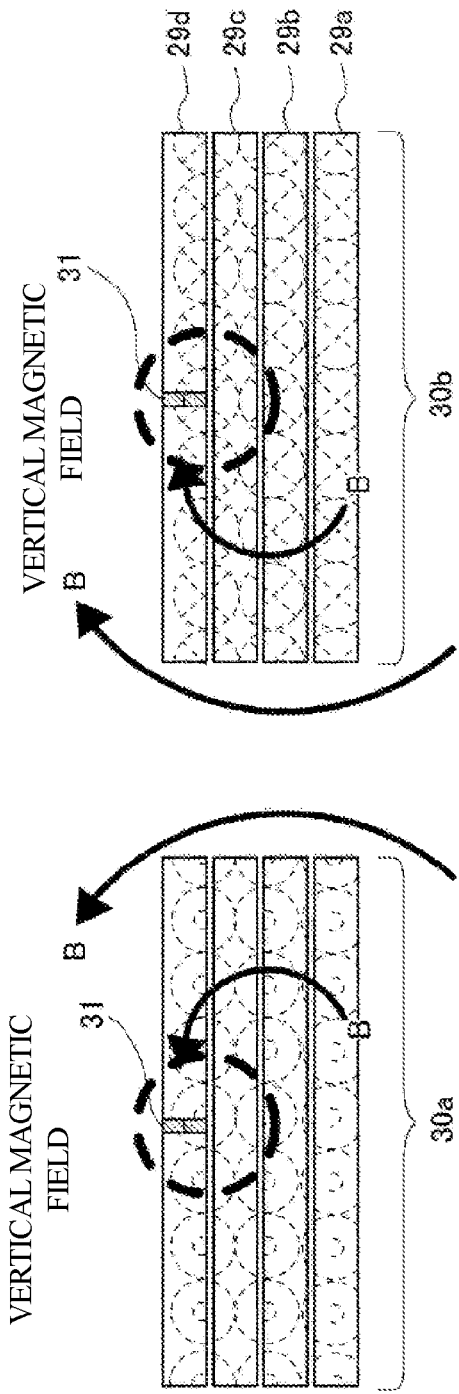
FIG. 15 is a view for describing a vertical magnetic field of the superconducting wire material constituting racetrack type coils of respective layers of a superconducting coil laminated body.

The superconducting field pole 28 shown in FIG. 14 has a structure of laminating a plurality of racetrack type coils 29, each of which is made of a pair of linear portions 30a, 30b opposed to each other, and a pair of arc portions 30c, 30d opposed to each other and joining both ends of the linear portions 30a, 30b in planar view (when seen from an extending direction of a central axis of the coils). Specifically, the superconducting field pole 28 shown in FIG. 14 is a non-cored superconducting coil body formed by laminating four racetrack type coils 29a to 29d. The racetrack type coils 29a to 29d of the respective layers each have an air-cored structure obtained by spirally (like mosquito repelling incense) winding a tape-like (belt-like) superconducting wire material 31 like a pancake around an oval winding frame not shown so as to form a racetrack shape, and then removing the winding frame. The number of laminations of the racetrack type coils 29 in the superconducting coil body is not limited to four.

Furthermore, a cross section of each of the racetrack type coils 29a to 29d shown in FIG. 14 has a double-layered structure accompanying the double pancake winding. That is, the double-layered superconducting wire material 31 is formed in a lamination direction of the racetrack type coils 29 so that a longitudinal direction (a parallel direction) of a cross section of the superconducting wire material 31 is the lamination direction of the racetrack type coils 29, and a short direction (vertical direction) of the cross section of the superconducting wire material 31 is a radial direction of the racetrack type coils 29, and the cross section has a shape in which the relevant double-layered superconducting wire material 31 is arrayed from a radially inner side to a radially outer side of the racetrack type coils 29. The racetrack type coil 29 may have a single-layered structure by single pancake winding besides the double-layered structure by the double pancake winding.

Next, the configuration example of the superconducting field pole 28 shown in FIG. 5 will be described.

The superconducting field poles 28 shown in FIG. 5 are arranged in the circumferential direction so as to correspond to the plurality of phases of the armature winding 40 in the rotor 16 of the superconducting electrical rotating machine, and are arranged so that a central axis of the racetrack type coils is directed to a radial direction of the rotor 16. As examples of the superconducting field poles 28 arranged in this manner, a superconducting field pole 28a, a superconducting field pole 28b, and a superconducting field pole 28c are shown in FIG. 5. The superconducting field pole 28a is arranged so that a central axis da of the racetrack type coils 29a to 29d constituting a superconducting coil body 27 thereof is directed to a radial direction ra with the central axis 14 of the rotor 16 as a starting point. Similarly, the superconducting field pole 28b is arranged so that a central axis db of the racetrack type coils 29a to 29d constituting the superconducting coil body 27 thereof is directed to a radial direction rb with the central axis 14 of the rotor 16 as a starting point. Similarly, the superconducting field pole 28c is arranged so that a central axis dc of the racetrack type coils 29a to 29d constituting the superconducting coil body 27 thereof is directed to a radial direction rc with the central axis 14 of the rotor 16 as a starting point.

Moreover, in each of the superconducting field poles 28 shown in FIG. 5, the ferromagnetic outer magnetic field-deflecting member 60 is arranged on the end face of the superconducting coil body 27 at the radially outer side of the rotor 16, the superconducting coil body 27 having the racetrack type coils 29a to 29d of the four layers laminated, and the ferromagnetic inner magnetic field-deflecting member 50 is arranged on the end face of the relevant superconducting coil body 27 at the radially inner side of the rotor 16. That is, the ferromagnetic magnetic field-deflecting members 60, 50 are arranged on the end face of the superconducting coil body 27 at the radially inner side of the rotor 16, and on the end face of the superconducting coil body 27 at the radially outer side of the rotor 16, respectively to sandwich the superconducting coil body 27 by the relevant magnetic field-deflecting members in the axial direction. This enables the shapes of the magnetic field-deflecting members 60, 50 to be arbitrarily changed in order to embody reduction of the vertical magnetic field of the superconducting wire member 31 (the first measure), intensification of the magnetic field of the superconducting field pole 28 (the second measure), and deflection of the magnetic field distribution of the superconducting field pole 28 to a direction where the magnetic field easily cross the armature winding 40 (a third measure). As a secondary effect, as compared with a case where the magnetic field-deflecting member is arranged in each of the layers of the superconducting coil body 27, expansion in a diameter of the rotor 16 can also be suppressed.

Here, the "ferromagnetism" means a property of strongly magnetizing an external magnetic field. Accordingly, the outer magnetic field-deflecting member 60 and the inner magnetic field-deflecting member 50 exhibit the ferromagnetism, by which a deflection action of the magnetic flux crossing the superconducting coil body 27 effectively functions. In view of the deflection action, preferably, the outer magnetic field-deflecting member 60 and the inner magnetic-field deflecting member 50 may be more ferromagnetic than the superconducting coil body 27. As a material of the ferromagnetic magnetic field-deflecting members 60, 50, for example, ferrite, a pressed powder core, permendur powder, carbon steel, ordinary structural rolled steel (SS400 or the like), nickel steel, silicon steel, a nano-crystal soft magnetic material manufactured by crystallizing an amorphous alloy obtained by compositely adding copper (Cu) and niobium (Nb) to an Fe—Si—B compound, and so on.

Moreover, a volume of the inner magnetic field-deflecting member 50 is made larger than a volume of the outer magnetic field-deflecting member 60. That is, in view of the influence by the magnetic field distribution of the superconducting field pole adjacent in the circumferential direction of the rotor (hereinafter, referred to as the adjacent pole), the volume of the inner magnetic field-deflecting member 50, which is closer to the adjacent pole (the influence is stronger), is made larger than the volume of the outer magnetic field-deflecting member 60, which is farther from the adjacent pole (the influence is weaker). For describing effects of Embodiment 1, in FIG. 9, an inner magnetic field-deflecting member 51 having the same volume as the outer magnetic field-deflecting member 60 is illustrated. Embodiment 5 shown in FIG. 9 will be cited for describing effects of the following embodiments besides the present embodiment.

Figure 9:
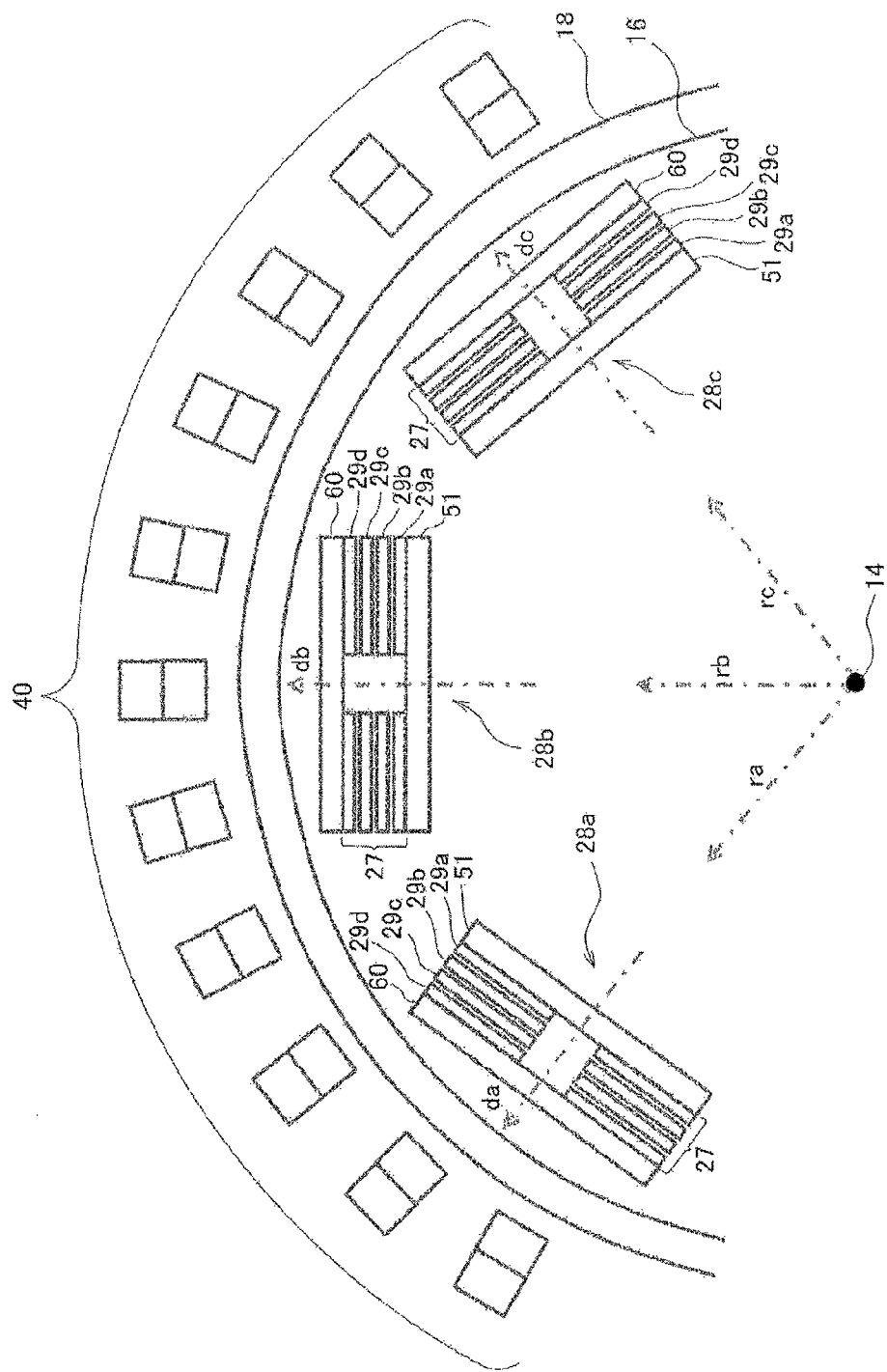
FIG. 9 is a view showing a configuration example of a superconducting field pole according to Embodiment 5 of the present invention.

The above-described configuration of the inner magnetic field-deflecting member 50 and the outer magnetic-field deflecting member 60 can reduce the influence by the magnetic field distribution of the adjacent pole, as compared with Embodiment 5 shown in FIG. 9. Moreover, as a result, the vertical magnetic field of the superconducting wire material 31 in an inner circumferential portion close to the adjacent pole of the superconducting coil body 27 can be reduced. Moreover, as compared with Embodiment 5 shown in FIG. 9, since the ferromagnetic bodies are in the vicinity of the superconducting coil body 27, a generated magnetic flux becomes larger, so that intensity of a magnetic flux directed from the end face of the superconducting coil body 27 at the radially inner side of the rotor 16 to the end face at the radially outer side thereof, in turn, intensity of a magnetic flux directed from the superconducting coil body 27 of the rotor 16 to the armature winding 40 of the stator 18 can be made larger. Moreover, as compared with Embodiment 5 shown in FIG. 9, the vertical magnetic field of the superconducting wire material 31 in the outer circumferential portion close to the adjacent pole of the superconducting coil body 27 can be reduced, and the magnetic flux can be deflected so as to be directed from the superconducting field pole 28 to the armature winding 40 in the outer circumferential portion. For these reasons, as compared with Embodiment 5 shown in FIG. 9, the wire material vertical magnetic field that the superconducting coil 27 undergoes is reduced, by which the critical current is enhanced, and the interlinkage magnetic flux that crosses both the superconducting field pole 28 of the rotor 16 and the armature winding 40 of the stator 18 is increased, so that output of the superconducting electrical rotating machine 10 can be enhanced.

While in FIG. 5, the configuration is shown in which both the inner magnetic field-deflecting member 50 and the outer magnetic field-deflecting member 60 have a shape in which no hole is opened in a central portion when seen from an extending direction of a central axis of the superconducting coil body 27, this is one example, and in the present embodiment, the hole may be opened or may not be opened. This is similar to Embodiments 2 to 6 described later. An embodiment in which the relevant hole is not opened is described in Embodiment 7, and an embodiment in which the relevant hole is opened is described in Embodiment 8.

(Embodiment 2)

Figure 6:
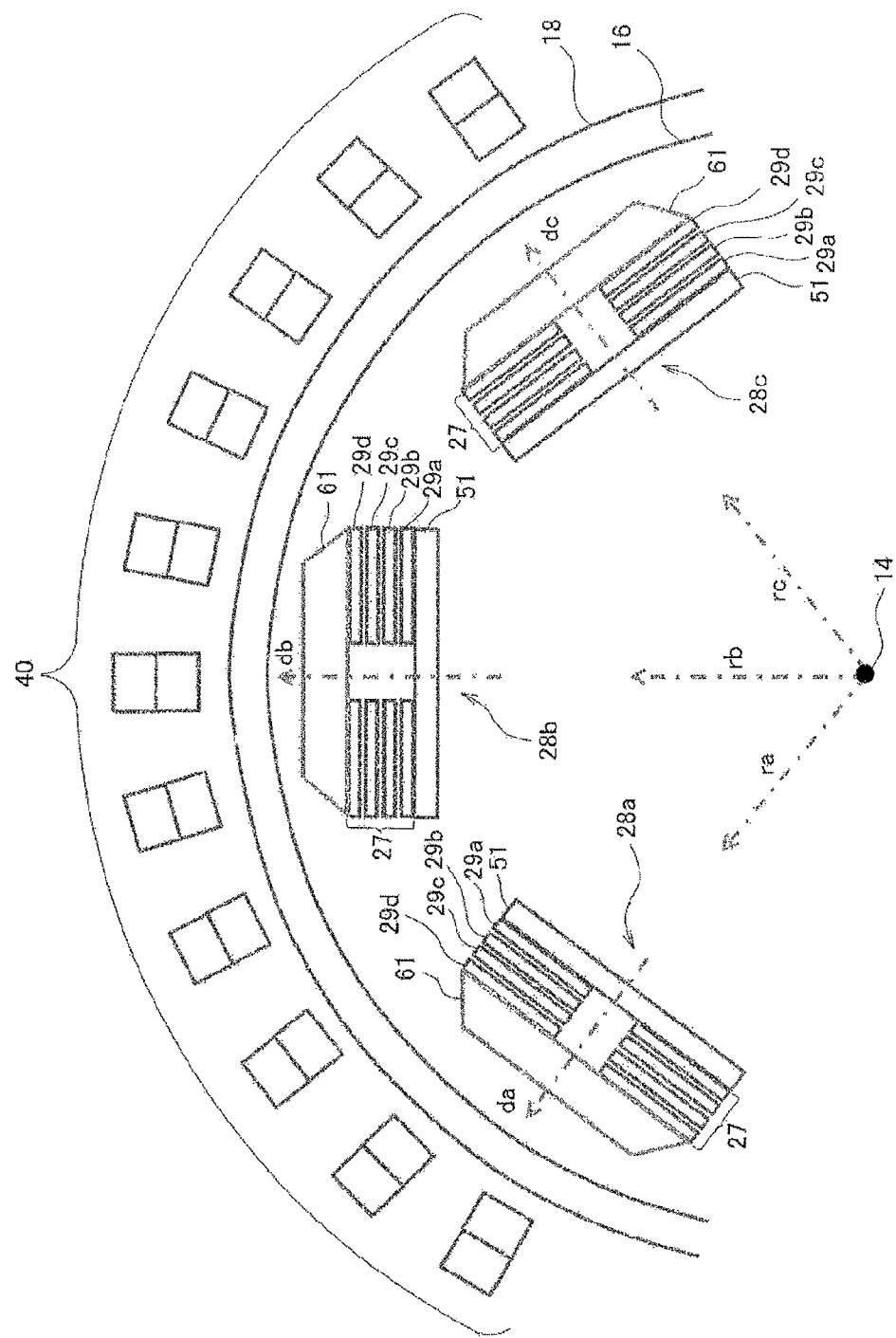
FIG. 6 is a view showing a configuration example of a superconducting field pole according to Embodiment 2 of the present invention.

FIG. 6 is a view showing a configuration example of a superconducting field pole 28 according to Embodiment 2 of the present invention.

In the superconducting field pole 28 shown in FIG. 6, an outer magnetic field-deflecting member 61 is arranged throughout an entire end face of a superconducting coil body 27 at a radially outer side of a rotor 16, the superconducting coil body 27 being formed by laminating a plurality of racetrack type coils 29. In addition, the outer magnetic field-deflecting member 61 is formed into a plate shape in which a central portion is thicker than an outer circumferential portion. As the "plate shape in which the central portion is thicker than the outer circumferential portion", for example, a conical shape, a truncated conical shape, a hemispherical shape, and a shape in which a small-diameter cylindrical body is provided continuously and coaxially on one end face of a large-diameter cylindrical body can be cited. The truncated conical shape includes a case of a racetrack shape in planar view and a trapezoidal shape in side view. Moreover, the present invention is not limited to the condition that the central portion is thicker and the outer circumferential portion is thinner throughout an entire circumference of the end face of the superconducting coil laminated body 27 at the radially outer side of the rotor 16, but the central portion may be thicker and the outer circumferential portion may be thinner in at least a partial range of the circumference of the end face.

Moreover, in Embodiment 2, a relationship between volumes of the outer magnetic field-deflecting member 61 and an inner magnetic field-deflecting member 51 is not particularly designated. While the inner magnetic field-deflecting member 51 shown in FIG. 6 is formed into a plate shape thinner than the inner magnetic field-deflecting member 50 in Embodiment 1, the present invention is not limited thereto.

According to the above-described shape of the outer magnetic field-deflecting member 61, as compared with Embodiment 5 shown in FIG. 9, the magnetic flux can be deflected so that the magnetic field from the superconducting field pole 28 to the armature winding 40 easily passes the central portion of the outer magnetic field-deflecting member 61. As a result, a vertical magnetic field of a superconducting wire material 31 constituting racetrack type coils 29a to 29d of respective layers of the superconducting coil body 27 can be reduced, and magnetic field distribution of the superconducting coil body 27 can be deflected to a direction where the magnetic field easily cross the armature winding 40. In other words, a leakage magnetic flux can be used as a valid magnetic flux.

Particularly, the outer magnetic field-deflecting member 61 may be formed into a shape in which the central portion has a predetermined thickness, and the thickness becomes smaller from the central portion to the outer circumferential portion. As this shape, for example, a tapered shape (truncated conical shape) can be cited. According to the above-described shape of the outer magnetic field-deflecting member 61, the foregoing plate shape in which the central portion is thicker than the outer circumferential portion can be easily manufactured.

(Embodiment 3)

Figure 7:
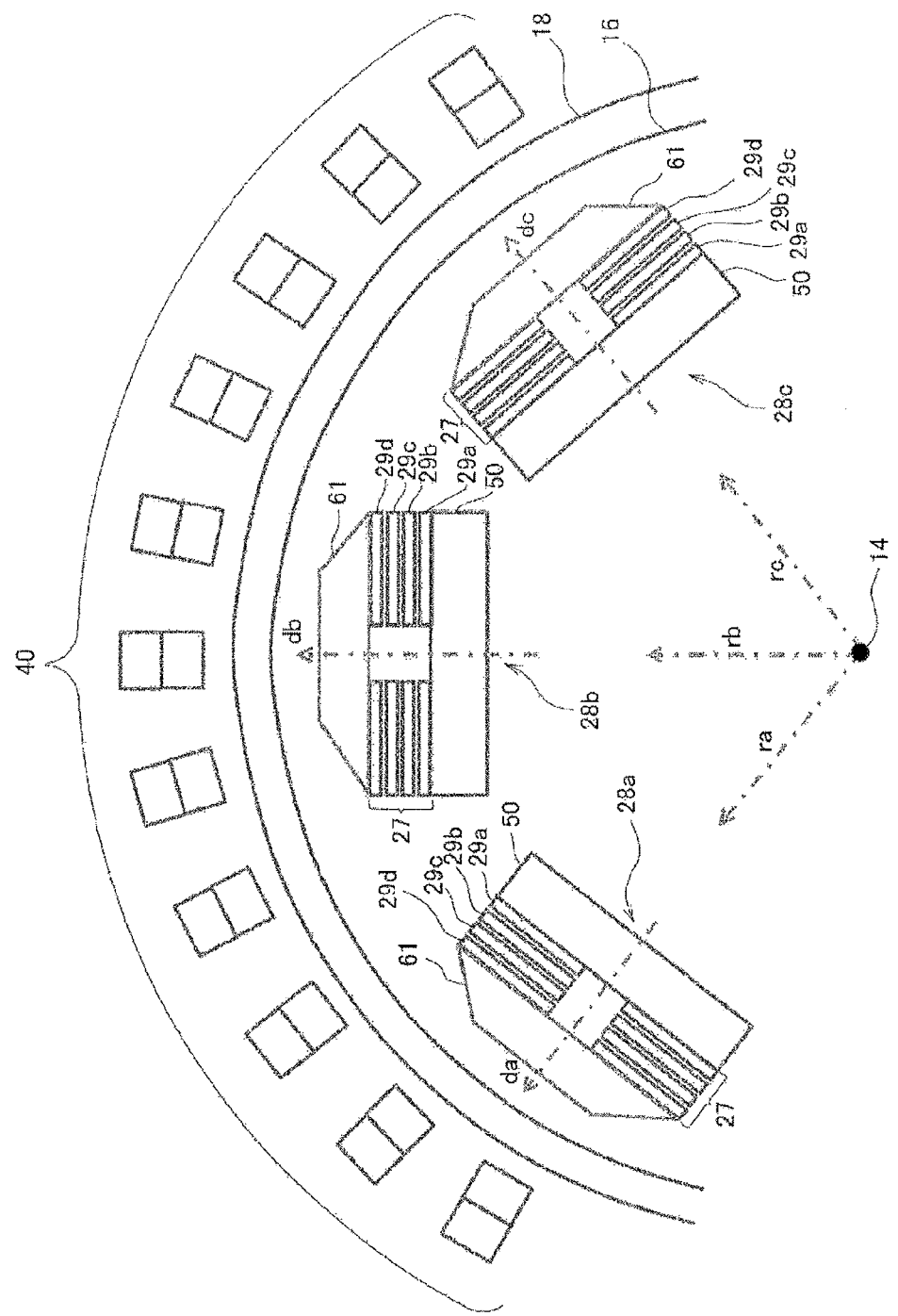
FIG. 7 is a view showing a configuration example of a superconducting field pole according to Embodiment 3 of the present invention.

FIG. 7 is a view showing a configuration example of a superconducting field pole 28 according to Embodiment 3 of the present invention.

Embodiment 3 results from combining Embodiment 1 and Embodiment 2. That is, a volume of an inner magnetic field-deflecting member 50, which is closer to an adjacent pole, is made larger than a volume of an outer magnetic field-deflecting member 61, which is farther from the adjacent pole. Furthermore, the outer magnetic field-deflecting member 61 is arranged throughout an entire end face of a superconducting coil body 27 at a radially outer side of a rotor 16, and is formed into a plate shape in which a central portion is thicker than an outer circumferential portion.

According to the above-described shape, as compared with Embodiment 5 shown in FIG. 9, a vertical magnetic field of a superconducting wire material 31 constituting racetrack type coils 29a to 29d of respective layers of the superconducting coil body 27 is reduced, by which a critical current can be enhanced, and an interlinkage magnetic flux that crosses both the superconducting field pole 28 of the rotor 16 and an armature winding 40 of a stator 18 is further increased, so that output of a superconducting electrical rotating machine 10 can be further enhanced. As described in Embodiment 2, the outer magnetic field-deflecting member 61 may be formed into the shape in which the central portion has a predetermined thickness, and the thickness becomes smaller from the central portion to the outer circumferential portion, or may be formed so that an outer circumferential portion of the portion having the predetermined thickness of the outer magnetic field-deflecting member 61 is located in the vicinity of an inner circumferential portion of the racetrack type coil 29 when seen from an extending direction of each central axis (da, db, dc) of the racetrack type coils 29.

Figures 12, 13:
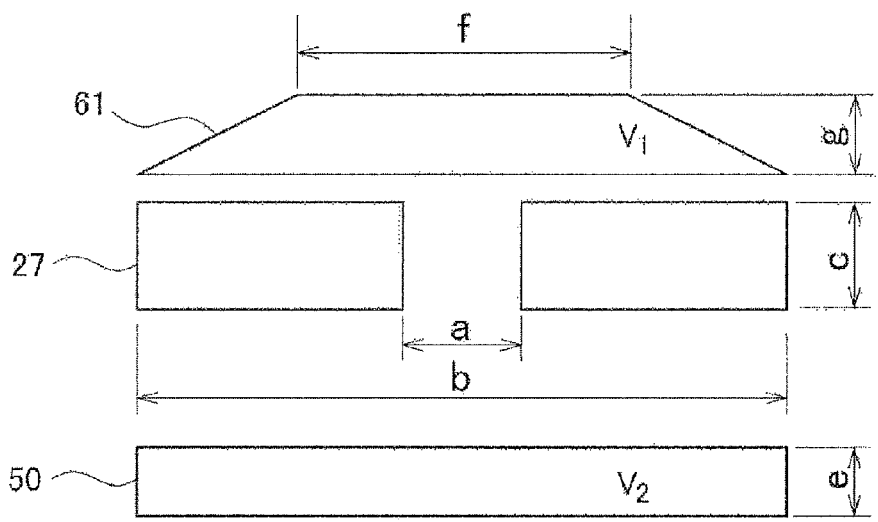
FIG. 12 is a schematic view that defines respective dimensions of the superconducting field pole according to Embodiment 3 of the present invention, and volumes of outer and inner magnetic field-deflecting members of the same superconducting field pole.
FIG. 13 is a view showing a decreasing rate of a maximum magnetic field of a wire material and an increasing rate of motor output in each of the models as a result from performing analysis using analysis models (1/6 models of a six-pole motor having the magnetic field-deflecting members) corresponding to Embodiments 1, 3, and 4 of the present invention.

Hereinafter, referring to FIG. 12, a conditional expression that prescribes respective dimensions of the superconducting field pole 28 according to Embodiment 3, and the volumes of the outer and inner magnetic field-deflecting members of the same will be described. FIG. 12 is a schematic view that defines the respective dimensions of the superconducting field pole according to Embodiment 3, and the volumes of the outer and inner magnetic field-deflecting members of the same.

In FIG. 12, using the 1/6 models of the six-pole superconducting motor, an inner diameter (a diameter of an air-cored portion) of the superconducting coil laminated body 27 is represented by "a", an outer diameter (a length of a short side) of the superconducting coil laminated body 27 is represented by "b", a length of the superconducting coil laminated body 27 in the radial direction of the rotor 16 is represented by "c", a length of the inner magnetic field-deflecting member 50 in the radial direction is represented by "e", a length (a distance between an upper bottom width and a lower bottom width) of the outer magnetic field-deflecting member 61 in the radial direction is represented by "g", and the upper bottom width of the outer magnetic field-deflecting member 61 is represented by "f". Furthermore, in FIG. 12, the volume of the outer magnetic field-deflecting member 61 is represented by $V_1$, and the volume of the inner magnetic field-deflecting member 50 is represented by $V_2$.

Here, a conditional expression of the upper bottom width f is represented by the following expression (1), and a volume ratio between the outer and inner magnetic field-deflecting members is represented by the following expression (2).

$$0.3b+0.7a<f<0.9+0.1a \quad (1)$$

$$0.60<V1/V2<0.98 \quad (2)$$

(Embodiment 4)

Figure 8:
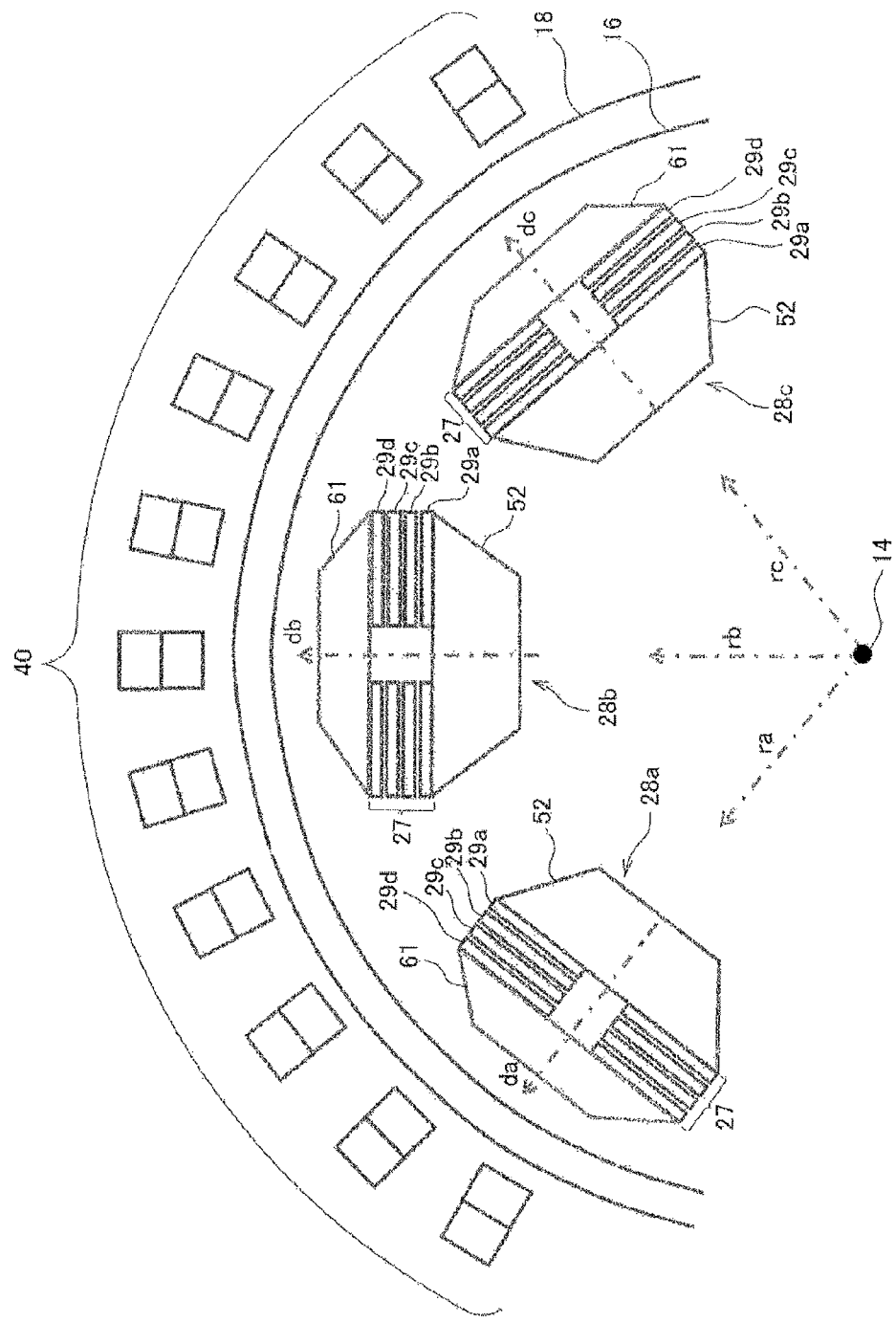
FIG. 8 is a view showing a configuration example of a superconducting field pole according to Embodiment 4 of the present invention.

FIG. 8 is a view showing a configuration example of a superconducting field pole 28 according to Embodiment 4 of the present invention.

In Embodiment 4, the shape of the inner magnetic field-deflecting member 50 in Embodiment 3 shown in FIG. 7 is changed to a shape of an inner magnetic field-deflecting member 52 that is arranged throughout an entire end face of a superconducting coil laminated body 27, the end face being at a radially inner side of a rotor 16 and the superconducting coil laminated body 27 being formed by laminating the plurality of racetrack type coils 29, and that is formed into a plate shape in which a central portion is thicker than an outer circumferential portion, similarly to the outer magnetic field-deflecting member 61. As the "plate shape in which the central portion is thicker than the outer circumferential portion", for example, a conical shape, a truncated conical shape, a hemispherical shape, and a shape in which a small-diameter cylindrical body is provided continuously and coaxially on one end face of a large-diameter cylindrical body can be cited.

Moreover, as to a relationship of volumes between the outer magnetic field-deflecting member 61 and the inner magnetic field-deflecting member 52, similar to Embodiment 3 shown in FIG. 7, the volume of the inner magnetic field-deflecting member 52, which is closer to an adjacent pole, is made larger than the volume of the outer magnetic field-deflecting member 61, which is farther from the adjacent pole. That is, in view of influence of magnetic field distribution by a superconducting field pole adjacent in a circumferential direction of the rotor (hereinafter, referred to as an adjacent pole), the volume of the inner magnetic field-deflecting member 52, which is closer to the adjacent pole (the influence is stronger), is made larger than the volume of the outer magnetic field-deflecting member 61, which is farther from the adjacent pole (the influence is weaker).

According to the above-described shape, as compared with Embodiment 5 shown in FIG. 9, a vertical magnetic field of a superconducting wire material 31 constituting racetrack type coils 29a to 29d of respective layers of the superconducting coil body 27 is reduced, by which a critical current is enhanced, and a magnetic flux directed from the superconducting field pole 28 to the armature winding 40 can be deflected so that the relevant magnetic flux easily passes central portions of the inner magnetic field-deflecting member 52 and the outer magnetic field-deflecting member 61. This can further increase an interlinkage magnetic flux that crosses both the superconducting field pole 28 of the rotor 16 and the armature winding 40 of the stator 18, and output of a superconducting electrical rotating machine 10 can be further enhanced. Similar to the outer magnetic field-deflecting member 61 of Embodiment 3, the inner magnetic field-deflecting member 52 may be formed into a shape in which the central portion has a predetermined thickness, and the thickness becomes smaller from the central portion to the outer circumferential portion.

(Embodiment 5)

Figure 10:
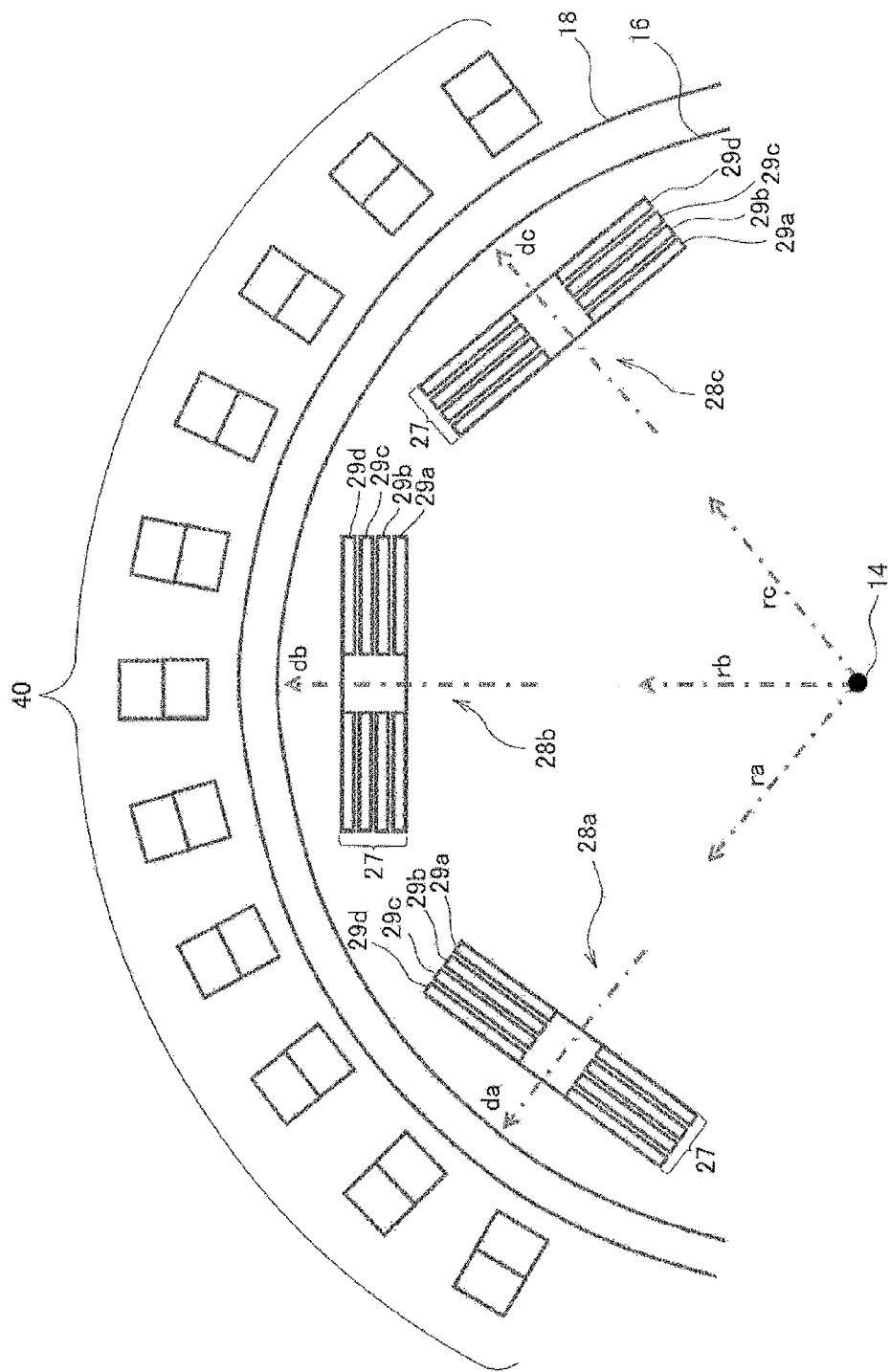
FIG. 10 is a view showing a configuration of a superconducting field pole according to a comparative embodiment.

FIG. 9 is a view showing a configuration example of a superconducting field pole 28 according to Embodiment 5 of the present invention. FIG. 10 is a view showing a configuration of a superconducting field pole according to a comparative embodiment.

In Embodiment 5, the inner magnetic field-deflecting member 50 in Embodiment 3 shown in FIG. 5 is replaced by an inner magnetic field-deflecting member 51 having the same volume as that of an outer magnetic field-deflecting member 60. On the other hand, the superconducting field pole according to the comparative embodiment includes no magnetic field-deflecting member.

Even in the configuration of the inner magnetic field-deflecting member 51 and the outer magnetic field-deflecting member 60 as in Embodiment 5, as compared with the case where no magnetic field-deflecting member is provided, as described with reference to FIG. 10, in a radial gap type superconducting electrical rotating machine, the ferromagnetic outer and inner magnetic field-deflecting members attract a magnetic flux directed to the superconducting coil body, which can reduce a vertical magnetic field of a wire material and enhance a critical current. Moreover, the ferromagnetic bodies are in the vicinity of the superconducting coil body, which can make the generated magnetic flux large, and can increase an interlinkage magnetic flux that crosses both the superconducting field poles of a rotor and an armature winding of a stator, thereby enhancing output.

(Embodiment 6)

As to a superconducting field pole 28 according to Embodiment 6 of the present invention, in the superconducting field pole 28 according to any one of Embodiments 1 to 5, the inner magnetic field-deflecting members 50, 51 and the outer magnetic field-deflecting member 61 are made of a nano-crystal soft magnetic material manufactured by crystallizing an amorphous alloy obtained by compositely adding copper (Cu) and niobium (Nb) to an Fe—Si—B compound. Configurations other than this are the same as those of the superconducting field pole 28 according to any one of Embodiments 1 to 5. The above-described configuration can make the inner magnetic field-deflecting members 50, 51 and the outer magnetic field-deflecting member 61 lightweight. For example, as compared with a case where a material of the inner magnetic field-deflecting members 50, 51 and the outer magnetic field-pole deflecting member 61 is SS400, an effect of reducing a calorific value is at the same level, while a weight can be reduced by about 74%.

(Embodiment 7)

As to a superconducting field pole according to Embodiment 7 of the present invention, in the superconducting field pole according to any one of Embodiments 1 to 6, both the outer magnetic field-deflecting members 60, 61 and the inner magnetic field-deflecting members 50, 51, and 52 have a shape in which no hole is opened in a central portion when seen from an extending direction of a superconducting coil body.

As described above, as compared with a case where at least one of the outer magnetic field-deflecting member and the inner magnetic field-deflecting member has a shape in which a hole is opened in the central portion when seen from the extending direction of the central axis of the superconducting coil body, a magnetic flux directed from the superconducting field pole to an armature winding can be deflected so that the flux easily passes the central portions of the inner magnetic field-deflecting member and the outer magnetic field-deflecting member. This can further increase an interlinkage magnetic flux that crosses both the superconducting field poles of a rotor and the armature winding of a stator, and further enhance output of a superconducting electrical rotating machine.

(Embodiment 8)

Figure 11:
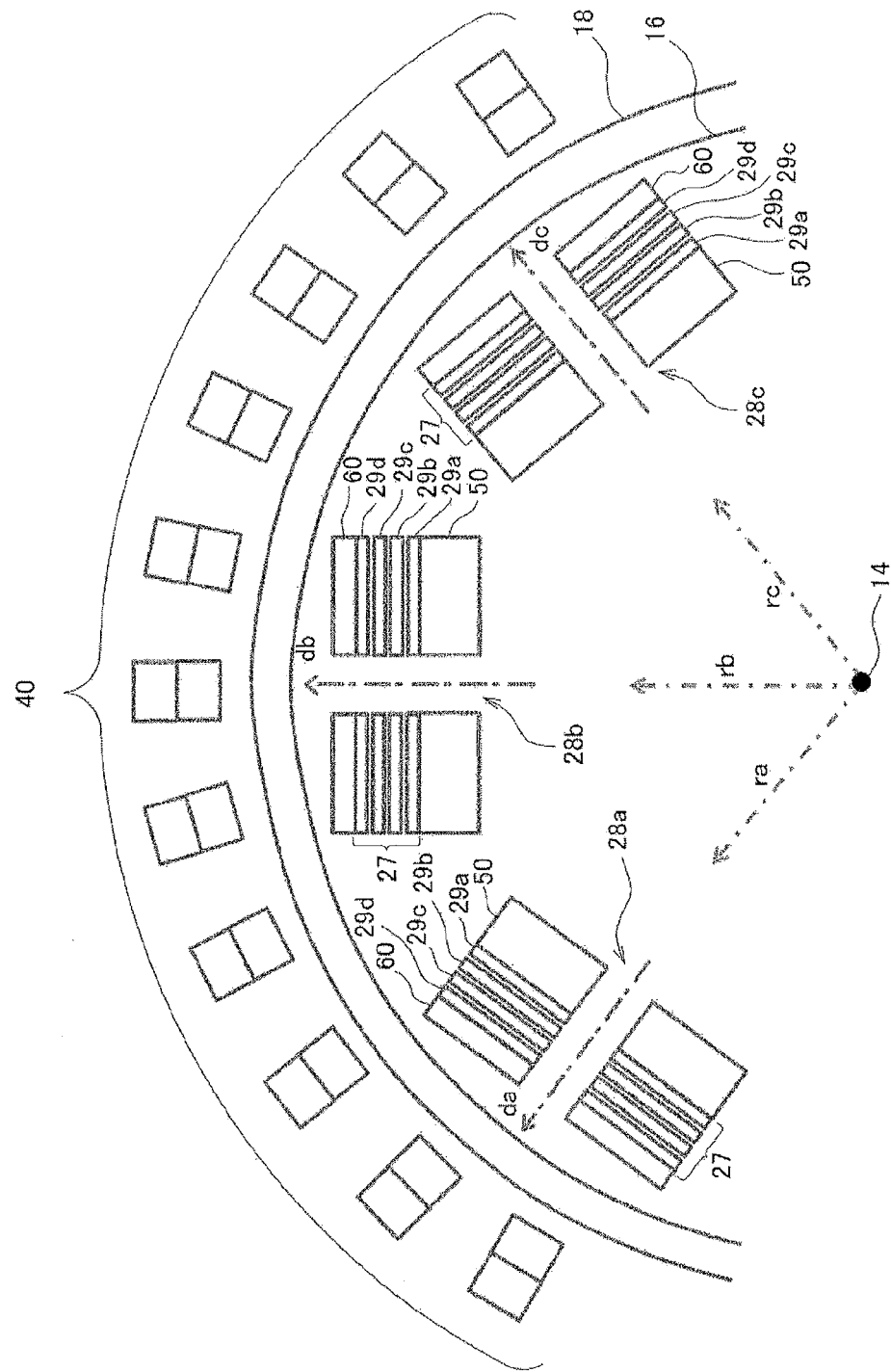
FIG. 11 is a view showing a configuration of a superconducting field pole according to Embodiment 8 of the present invention.

As to a superconducting field pole according to Embodiment 8 of the present invention, in the superconducting field pole according to any one of Embodiments 1 to 6, at least one of the outer magnetic field-deflecting members 60, 61 and the inner magnetic field-deflecting members 50, 51, and 52 has a shape in which a hole is opened in a central portion when seen from an extending direction of a central axis of a superconducting coil body. FIG. 11 illustrates a configuration of a shape in which in Embodiment 1, both the outer magnetic field-deflecting member 60 and the inner magnetic field-deflecting member 50 have a shape in which a hole is opened in the central portion.

According to the above-described configuration, as compared with the case where both the outer magnetic field-deflecting member and the inner magnetic field-deflecting member have a shape in which no hole is opened in the central portion when seen from the extending direction of the central axis of the superconducting coil body, the outer magnetic field-deflecting member or the inner magnetic field-deflecting member having the hole opened attracts a magnetic flux directed to the superconducting coil body, which can more reduce a maximum portion of a vertical magnetic field of a wire material constituting the superconducting field pole, and in turn, more enhance a critical current.

(Simulation Analysis)

FIG. 13 is a view showing a result from performing analysis using analysis models (1/6 models of a six-pole motor having magnetic field-deflecting members) corresponding to the comparative embodiment, and Embodiments 1, 3, 4, and 5. As items of the analysis models in FIG. 13, an analysis model O indicates the comparative embodiment shown in FIG. 10, to which the inner magnetic field-deflecting member and the outer magnetic field-deflecting member are not attached, an analysis model A indicates Embodiment 5 shown in FIG. 9, an analysis model B indicates Embodiment 1 shown in FIG. 5, an analysis model C indicates Embodiment 3 shown in FIG. 7, and an analysis model D indicates Embodiment 4 shown in FIG. 8. Moreover, as items of effects shown in FIG. 13, with an analysis result (a maximum magnetic field of a wire material: 2.298 T, motor output: 3.04 MW) of the analysis model O used as a reference, a maximum magnetic field of the wire material is indicated by a value of a decreasing rate, and motor output is indicated by a value of an increasing rate. According to the items of the effects shown in FIG. 13, it is found that the decreasing rate of the maximum magnetic field of the wire material of the analysis model D is the largest, and that the increasing rate of the motor output of the analysis model C is the largest.

From the foregoing description, many modifications and other embodiments of the present invention are obvious to those in the art. Accordingly, the foregoing description should be construed as only exemplification, and has been given for the purpose of providing best aspects to carry out the present invention. Details of the structure and/or the function can be substantially changed without departing from the spirit of the present invention.

INDUSTRIAL APPLICABILITY

The present invention is useful for a radial gap type superconducting electrical rotating machine in which a rotor is made superconducting and a stator is made normal-conducting, and a stator winding arranged in the stator is made air-cored.

REFERENCE SIGNS LIST

10 superconducting electrical rotating machine
12 housing
14 central axis
16 rotor
18 stator
20 rotor shaft
22 rotor core
24 casing
27 superconducting coil body
28, 28a, 28b, 28c superconducting field pole
29, 29a, 29b, 29c, 29d racetrack type coil
30a, 30b linear portion
30c, 30d arc portion
31 superconducting wire material
32 back yoke
34 teeth
36 slot
40 armature winding
50, 51, 52 inner magnetic field-deflecting member
60, 61 outer magnetic field-deflecting member

The invention claimed is:

1. A plurality of superconducting field poles arranged in a circumferential direction so as to correspond to a plurality of phases of an armature winding in a rotor of a superconducting electrical rotating machine, the rotor being disposed coaxially with a stator in an internal space of the cylindrical stator in which the armature winding of the plurality of phases is arranged in the circumferential direction, each of the superconducting field poles comprising:
    a superconducting coil body formed by spirally winding a superconducting wire material;
    an outer magnetic field-deflecting member made of a ferromagnetic material, the outer magnetic field-deflecting member being arranged on or in the vicinity of an end face of the superconducting coil body at a radially outer side of the rotor; and
    an inner magnetic field-deflecting member made of a ferromagnetic material, the inner magnetic field-deflecting member being arranged on or in the vicinity of an end face of the superconducting coil body at a radially inner side of the rotor, wherein
    the outer magnetic field-deflecting members corresponding to the respective superconducting field poles are separated from one another, and the inner magnetic field-deflecting members corresponding to the respective superconducting field poles are separated from one another, and in each of the superconducting field poles, a volume of the inner magnetic field-deflecting member is larger than a volume of the outer magnetic field-deflecting member.

2. The plurality of superconducting field poles according to claim 1, wherein in each of the superconducting field poles, the outer magnetic field-deflecting member is arranged throughout the entire end face of the superconducting coil body at the radially outer side of the rotor, and is formed into a plate shape in which a central portion is thicker than an outer circumferential portion.

3. The plurality of superconducting field poles according to claim 2, wherein in each of the superconducting field poles, the outer magnetic field-deflecting member is formed so that the central portion has a predetermined thickness, and the thickness becomes smaller from the central portion to the outer circumferential portion.

4. The plurality of superconducting field poles according to claim 1, wherein in each of the superconducting field poles, the inner magnetic field-deflecting member and the outer magnetic field-deflecting member are made of a nanocrystal soft magnetic material manufactured by crystallizing an amorphous alloy obtained by compositely adding copper (Cu) and niobium (Nb) to an Fe—Si—B compound.

5. The plurality of superconducting field poles according to claim 1, wherein in each of the superconducting field poles, both the outer magnetic field-deflecting member and the inner magnetic field-deflecting member have a shape in which no hole is opened in a central portion when seen from an extending direction of a central axis of the superconducting coil body.

6. A plurality of superconducting field poles arranged in a circumferential direction so as to correspond to a plurality of phases of an armature winding in a rotor of a superconducting electrical rotating machine, the rotor being disposed coaxially with a stator in an internal space of the cylindrical stator in which the armature winding of the plurality of phases is arranged in the circumferential direction, each of the superconducting field poles comprising:

a superconducting coil body formed by spirally winding a superconducting wire material;

an outer magnetic field-deflecting member made of a ferromagnetic material, the outer magnetic field-deflecting member being arranged on or in the vicinity of an end face of the superconducting coil body at a radially outer side of the rotor; and an inner magnetic field-deflecting member made of a ferromagnetic material, the inner magnetic field-deflecting member being arranged on or in the vicinity of an end face of the superconducting coil body at a radially inner side of the rotor, wherein the outer magnetic field-deflecting members corresponding to the respective superconducting field poles are separated from one another, and the inner magnetic field-deflecting members corresponding to the respective superconducting field poles are separated from one another, and in each of the superconducting field poles, the inner magnetic field-deflecting member is arranged throughout the entire end face of the superconducting coil body at the radially inner side of the rotor, and is formed into a plate shape in which a central portion is thicker than an outer circumferential portion.

7. The plurality of superconducting field poles according to claim 6, wherein in each of the superconducting field poles, the inner magnetic field-deflecting member is formed so that the central portion has a predetermined thickness, and the thickness becomes smaller from the central portion to the outer circumferential portion.

8. A plurality of superconducting field poles arranged in a circumferential direction so as to correspond to a plurality of phases of an armature winding in a rotor of a superconducting electrical rotating machine, the rotor being disposed coaxially with a stator in an internal space of the cylindrical stator in which the armature winding of the plurality of phases is arranged in the circumferential direction, each of the superconducting field poles comprising:

a superconducting coil body formed by spirally winding a superconducting wire material;

an outer magnetic field-deflecting member made of a ferromagnetic material, the outer magnetic field-deflecting member being arranged on or in the vicinity of an end face of the superconducting coil body at a radially outer side of the rotor; and an inner magnetic field-deflecting member made of a ferromagnetic material, the inner magnetic field-deflecting member being arranged on or in the vicinity of an end face of the superconducting coil body at a radially inner side of the rotor, wherein the outer magnetic field-deflecting members corresponding to the respective superconducting field poles are separated from one another, and the inner magnetic field-deflecting members corresponding to the respective superconducting field poles are separated from one another, and in each of the superconducting field poles, at least one of the outer magnetic field-deflecting member and the inner magnetic field-deflecting member has a shape in which a hole is opened in a central portion when seen from an extending direction of a central axis of the superconducting coil body.

* * * * *